(12) United States Patent
Petrides

(10) Patent No.: US 8,542,322 B2
(45) Date of Patent: *Sep. 24, 2013

(54) MOTION COMPENSATED INTERPOLATION SYSTEM USING COMBINATION OF FULL AND INTERMEDIATE FRAME OCCLUSION

(75) Inventor: Gordon Petrides, Mead, WA (US)

(73) Assignee: STMicroelectronics, Inc., Coppell, TX (US)

( * ) Notice: Subject to any disclaimer, the term of this patent is extended or adjusted under 35 U.S.C. 154(b) by 435 days.

This patent is subject to a terminal disclaimer.

(21) Appl. No.: 12/715,235

(22) Filed: Mar. 1, 2010

(65) Prior Publication Data

US 2011/0211125 A1  Sep. 1, 2011

(51) Int. Cl.
*H04N 5/00* (2011.01)
*H04N 7/12* (2006.01)

(52) U.S. Cl.
USPC ...... 348/616; 348/614; 348/607; 375/240.12; 375/240.16

(58) Field of Classification Search
None
See application file for complete search history.

(56) References Cited

U.S. PATENT DOCUMENTS

| 2004/0252759 | A1* | 12/2004 | Winder et al. | 375/240.12 |
| 2008/0186404 | A1* | 8/2008 | Bull et al. | 348/616 |
| 2008/0204600 | A1* | 8/2008 | Xu et al. | 348/607 |
| 2009/0251612 | A1* | 10/2009 | Van Gurp | 348/614 |
| 2010/0309371 | A1* | 12/2010 | Zhong | 348/448 |
| 2011/0211119 | A1* | 9/2011 | Petrides | 348/576 |
| 2011/0211128 | A1* | 9/2011 | Petrides | 348/699 |

* cited by examiner

*Primary Examiner* — Jefferey Harold
*Assistant Examiner* — Sean Haiem
(74) *Attorney, Agent, or Firm* — Beyer Law Group LLP

(57) ABSTRACT

In one embodiment of the present invention, motion compensated interpolation is performed by locating full frame conceal and reveal areas, determining intermediate frame occlusion areas of an interpolated frame of the displayable output by locating intermediate frame conceal areas based on projected locations of pixels within the full frame conceal areas using primary forward motion vectors and information about a time slot for the interpolated frame, and by locating intermediate frame reveal areas based on projected locations of pixels within the full frame reveal areas using primary backward motion vectors and information about the time slot for the interpolated frame. The intermediate frame conceal areas are then modified by projecting locations of pixels using secondary forward motion vectors and the intermediate frame reveal areas are modified by projecting locations of pixels using secondary backward motion vectors.

22 Claims, 27 Drawing Sheets

US 8,542,322 B2

MOTION COMPENSATED INTERPOLATION SYSTEM USING COMBINATION OF FULL AND INTERMEDIATE FRAME OCCLUSION

CROSS REFERENCE TO RELATED APPLICATIONS

This patent application is related and incorporates by reference in their entirety the following concurrently filed patent applications:
(i) U.S. patent application Ser. No. 12/715,233 entitled "OCCLUSION ADAPTIVE MOTION COMPENSATED INTERPOLATOR" by Petrides;
(ii) U.S. patent application Ser. No. 12/715,062 entitled "OBJECT SPEED WEIGHTED MOTION COMPENSATED INTERPOLATION" by Petrides;
(iii) U.S. patent application Ser. No. 12/715,014 entitled "BORDER HANDLING FOR MOTION COMPENSATED TEMPORAL INTERPOLATOR USING CAMERA MODEL" by Petrides; and
(iv) U.S. patent application Ser. No. 12/715,067 entitled "INTERMEDIATE FRAME OCCLUSION ESTIMATION SYSTEM USING PROJECTED VECTORS" by Petrides.

FIELD OF THE INVENTION

The invention relates to the display of images in a digital display, such as a television or monitor. More particularly, the present invention relates to a motion compensated interpolation system using a combination of full and intermediate frame occlusion.

BACKGROUND OF THE INVENTION

Video compression involves the removal of information in an input video stream that is indiscernible (or nearly so) to the viewer, in order to reduce the size of the video stream. Each event, such as a change in the image being displayed on a group of pixels, is then assigned a code. Commonly occurring events are assigned few bits and rare events will have codes with more bits. These steps are commonly called signal analysis, quantization and variable length encoding respectively. There are four methods for video compression, discrete cosine transform (DCT), vector quantization (VQ), fractal compression, and discrete wavelet transform (DWT). DCT is by far the most popular of the four.

One of the most common standards related to DCT video compression is the Moving Picture Expert Group (MPEG) standard. MPEG is actually a series of different standards designed with a specific application and bit rate in mind, although MPEG compression scales well with increased bit rates.

While MPEG has been used for years in computer displays, recently such compression schemes have been applied to other digital displays, such as high definition television (HDTV) sets.

Video compression commonly involves motion compensation. Motion compensation relies on the fact that, often, for many frames of a video, the only difference between one frame and another is the result of either the camera moving or an object in the frame moving. In reference to a video file, this means much of the information that represents one frame will be the same as the information used in the next frame, once corrected for the motion of the camera and/or objects.

Motion compensation takes advantage of this to provide a way to create video frames using a reference frame. Many of the frames in a video (the frames in between two reference frames) could be eliminated. The only information stored for the frames in between would be the information needed to transform the previous frame into the next frame.

Another reason to perform motion compensation in digital displays is to convert an analog or lower frame rate video source to a high frame rate digital signal. Most motion pictures, for example, run at a frame rate of roughly 30 frames per second. If the digital frame rate is higher than the input source frame rate, it is necessary to perform interpolation to arrive at values for blocks of pixels for frames occurring between actual frames of the input video source. By interpolating between the frames, the system is able to predict where an object would be located in such a hypothetical frame and then can generate such a frame for display between two actual vide source frames.

One way to reduce errors in interpolated frames is to use a 3 tap filter to arrive at motion compensated pixel values for each block of pixels in interpolated frames. Here, a forward motion vector is calculated for a fixed block of pixels (an object) in a previous frame (PREV). This is performed by searching for the same fixed block of pixels in a current frame (CURR) and then arriving at a motion vector indicating the amount of movement between the two frames. A backward motion vector is then calculated by taking a fixed block of pixels in the CURR frame and searching the PREV frames for a match.

A first pixel value for one pixel of the object in the interpolated frame can be derived by using the location for that pixel in the PREV frame compensated for by the forward motion vector. This is performed by first determining the amount of weighting that needs to be applied to the forward motion vector based on the timing of the interpolation. For example, if the interpolated frame is exactly midway between the PREV and CURR frames, then the forward motion vector can be weighted by ½, meaning that the object is assumed to have moved half the distance from the PREV frame to the interpolated frame as it appears to have moved from the PREV frame to the CURR frame. If, on the other hand, the interpolated frame is ⅓ of the way between the PREV and CURR frame, the forward motion vector may be weighted by ⅓. This weighted forward motion vector can then be applied to the pixel location in the PREV frame to obtain a location of that pixel in the interpolated frame.

A second pixel value for that pixel of the object in the interpolated frame can be derived by using the location for that pixel in the CURR frame compensated for by the backward motion vector. Again, a weighting is applied based on the temporal location of the interpolated frame between the CURR and PREV frames. For example, if the interpolated frame is ⅓ of the way between the PREV and CURR frame, the backward motion vector may be weighted by ⅔. This weighted backward motion vector can then be applied to the pixel location in the CURR frame to obtain a location of that pixel in the interpolated frame.

A third pixel value for that pixel of the object may be derived by simply performing temporal interpolation for the exact pixel involved (regardless of movement of objects). If, for example, the pixel changes from an orangish color to a purplish color from the PREV frame to the CURR frame, and the interpolated frame is exactly midway between the PREV frame and the CURR frame, the pixel value for the interpolated frame may be the color that is exactly mid way between the orangish color and the purplish color.

Absent a scene change, as described earlier, generally the only movement involved in a video involves either camera movement (e.g., pans or zooms) or object movement. Occlusion refers to the moving on an object with relation to a background. The object moves in front of the background, blocking certain portions of the background, hence the term "occlusion."

FIG. 1 is a diagram illustrating an example of occlusion. Here, an object 100 is moving in one direction, while a background 102 is moving in another. The occluded regions are dependent on the speed of the movements of the object and background with relation to each other, and represent the areas where the movement either unveils or conceals an area of the background from the previous frame. An area where the object 100 is present in both the previous frame and the current frame is generally not called an occluded area, even though technically the background is covered by the object in this area as well.

Traditionally, motion compensation algorithms such as the one described above suffer from problems with respect to occlusions. Depending upon the speed of the object with respect to the speed of the background, various visual artifacts can be seen when occlusions occur. Generally speaking, the faster the object moves with respect to the speed of the background, the more visual artifacts there are.

Judder is one commonly known artifact relating to fast motion. Judder is a subtle stuttering effect similar to blurring. Judder problems with modern displays, however, have been becoming less and less prevalent as manufacturers move to screens with higher refresh rates. For example, judder may occur on an older display having a 60 Mhz refresh rates, but more recent displays utilize 120 Mhz or even 240 Mhz refresh rates, which dramatically reduce such judder.

Another less well known visual artifact, however, is known as the halo artifact. These artifacts are characterized by pixel errors in the occlusions (reveal and conceal) areas of the picture. The errors appear as a type of visible "mushiness" in the occlusion region.

SUMMARY OF THE INVENTION

In one embodiment of the present invention, a method is provided for performing motion compensated interpolation using a previous frame and a current frame of a displayable output, the method comprising: determining full frame occlusion areas of the displayable output by locating full frame conceal areas where pixels of the previous frame have no match in the current frame and full frame reveal areas where pixels of the current frame have no match in the previous frame; determining intermediate frame occlusion areas of an interpolated frame of the displayable output by locating intermediate frame conceal areas based on projected locations of pixels within the full frame conceal areas using primary forward motion vectors and information about a time slot for the interpolated frame, and by locating intermediate frame reveal areas based on projected locations of pixels within the full frame reveal areas using primary backward motion vectors and information about the time slot for the interpolated frame; modifying the intermediate frame conceal areas by projecting locations of pixels using secondary forward motion vectors; and modifying the intermediate frame reveal areas by projecting locations of pixels using secondary backward motion vectors.

In another embodiment of the present invention, an interpolator is provided comprising: a forward data store containing an entry for each pixel in an intermediate frame to be interpolated from a current and previous frame of displayable output; a backward data store containing an entry for each pixel in the intermediate frame; a full frame occlusion generator configured to: determine full frame occlusion areas of the displayable output by locating full frame conceal areas where pixels of the previous frame have no match in the current frame and full frame reveal areas where pixels of the current frame have no match in the previous frame; an intermediate frame occlusion generator configured to: determine intermediate frame occlusion areas of an interpolated frame of the displayable output by locating intermediate frame conceal areas based on projected locations of pixels within the full frame conceal areas using primary forward motion vectors and information about a time slot for the interpolated frame, and by locating intermediate frame reveal areas based on projected locations of pixels within the full frame reveal areas using primary backward motion vectors and information about the time slot for the interpolated frame; an intermediate frame occlusion modifier configured to: modify the intermediate frame conceal areas by projecting locations of pixels using secondary forward motion vectors; and modify the intermediate frame reveal areas by projecting locations of pixels using secondary backward motion vectors.

In another embodiment of the present invention, an apparatus is provided for performing motion compensated interpolation using a previous frame and a current frame of a displayable output, the apparatus comprising: means for determining full frame occlusion areas of the displayable output by locating full frame conceal areas where pixels of the previous frame have no match in the current frame and full frame reveal areas where pixels of the current frame have no match in the previous frame; means for determining intermediate frame occlusion areas of an interpolated frame of the displayable output by locating intermediate frame conceal areas based on projected locations of pixels within the full frame conceal areas using primary forward motion vectors and information about a time slot for the interpolated frame, and by locating intermediate frame reveal areas based on projected locations of pixels within the full frame reveal areas using primary backward motion vectors and information about the time slot for the interpolated frame; means for modifying the intermediate frame conceal areas by projecting locations of pixels using secondary forward motion vectors; and means for modifying the intermediate frame reveal areas by projecting locations of pixels using secondary backward motion vectors.

In another embodiment of the present invention, a computer chip is provided configured to: determine full frame occlusion areas of the displayable output by locating full frame conceal areas where pixels of the previous frame have no match in the current frame and full frame reveal areas where pixels of the current frame have no match in the previous frame; determine intermediate frame occlusion areas of an interpolated frame of the displayable output by locating intermediate frame conceal areas based on projected locations of pixels within the full frame conceal areas using primary forward motion vectors and information about a time slot for the interpolated frame, and by locating intermediate frame reveal areas based on projected locations of pixels within the full frame reveal areas using primary backward motion vectors and information about the time slot for the interpolated frame; modify the intermediate frame conceal areas by projecting locations of pixels using secondary forward motion vectors; and modify the intermediate frame reveal areas by projecting locations of pixels using secondary backward motion vectors.

DETAILED DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

In a first embodiment of the present invention, special care is taken to detect occlusion areas of a display as they are occurring. Specifically, the system looks for conceal areas and reveal areas. A conceal area is one where a motion compensated pixel in the previous frame does not have a corresponding match in the current frame, meaning that a moving object has covered up the pixel in the most recent frame. A reveal area is one where a motion compensated pixel in the current frame does not have a corresponding match in the previous frame, meaning that a moving object has moved away from an area of the background, revealing the background underneath. Both conceal and reveal areas are occlusion areas.

Figure 1:
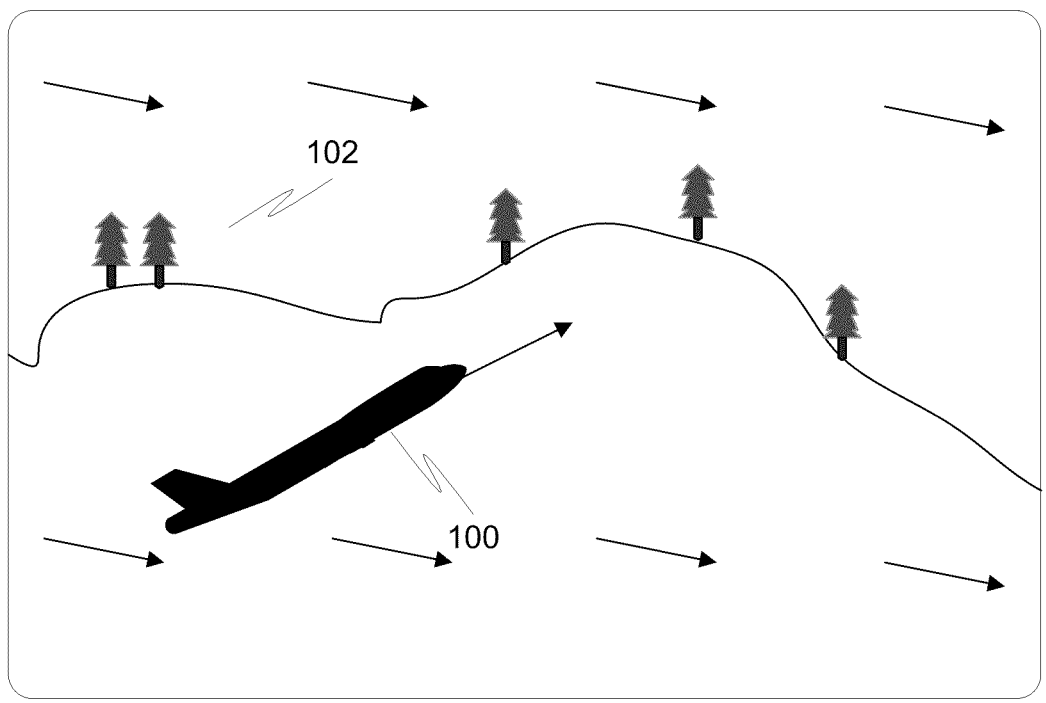
FIG. 1 is a diagram illustrating an example of occlusion.
Figure 2:
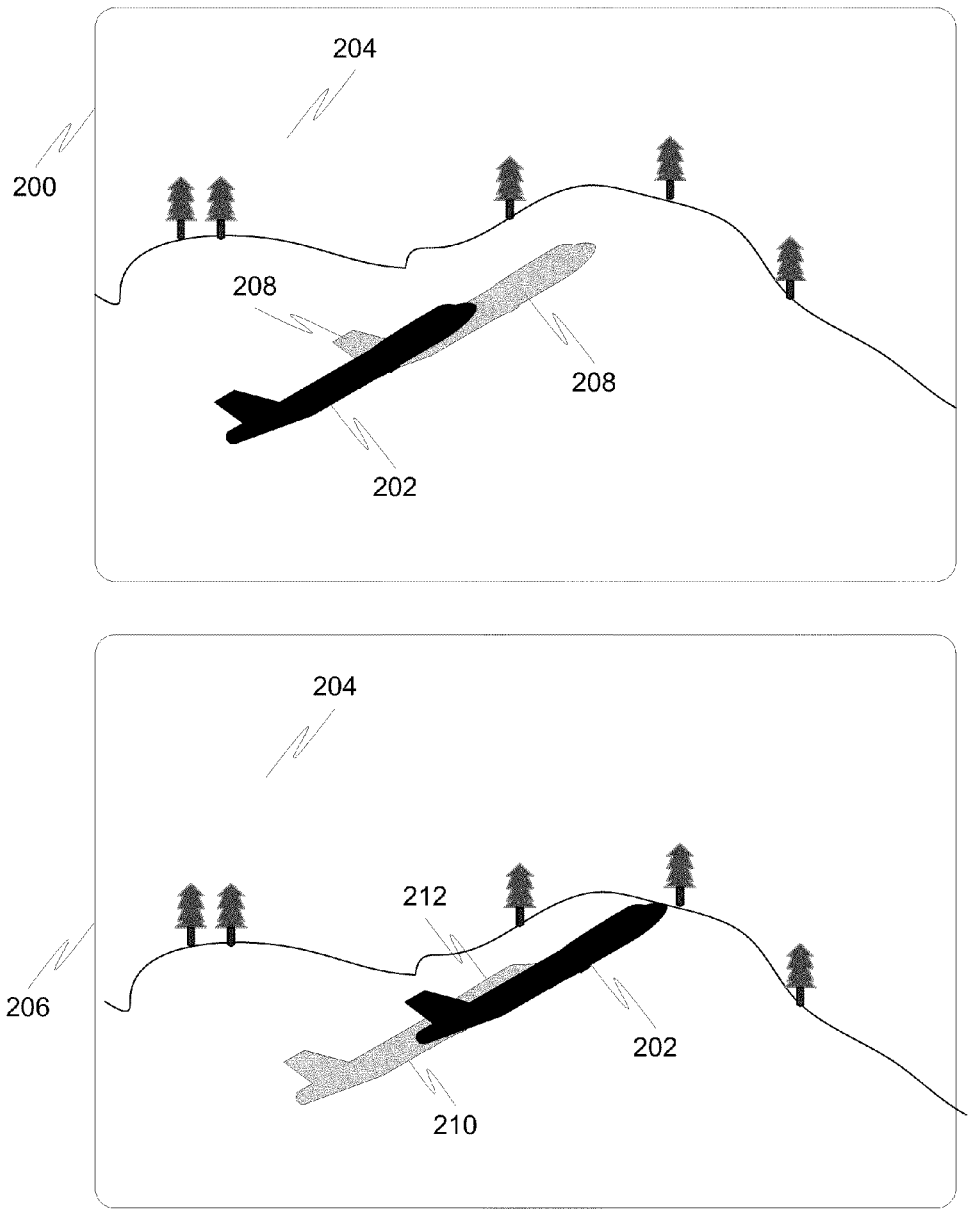
FIG. 2 is a diagram illustrating an example of conceal and reveal areas.

FIG. 2 is a diagram illustrating an example of conceal and reveal areas. In PREV frame 200, object 202 is in a certain location with respect to background 204. In CURR frame 206, the object 202 has moved to a different location with respect to background 204. The area 208 that the object has just recently covered up is a conceal area, while the area 210 that the object has just recently uncovered is a reveal area.

In the case where a conceal region is detected, an interpolator in accordance with the first embodiment of the present invention is designed to discard the motion compensated pixel in the current frame and any temporal average pixel that was computed. The interpolator then uses the motion compensated pixel in the previous frame alone as the value of the pixel in the interpolated frame.

In the case where a reveal region is detected, the interpolator in accordance with the first embodiment of the present invention is designed to discard the motion compensated pixel in the previous frame and any temporal average pixel that was computed. The interpolator then uses the motion compensated pixel in the current frame alone as the value of the pixel in the interpolated frame.

For all non-occlusion regions, a three-tap filter interpolation process may be utilized to compute the value for the interpolated frame.

The first embodiment of the present invention has the advantage of, in many cases, being just as effective in reducing the halo effect as very sophisticated interpolators, yet using a much simpler design that vastly improves efficiency.

In the case of computer chips, especially those used to control display devices, this improved efficiency translates directly into a lower cost.

YUV, also known as Y'CbCr and YPbPr, is a color space in which the Y stands for the luminance component (the brightness) and U and V are chrominance (color) components. It is commonly used in video applications, where it is also referred to as component video.

YUV signals are created from an original RGB (red, green and blue) source. The weighted values of R, G and B are added together to produce a single Y signal, representing the overall brightness, or luminance, of that spot. The U signal is then created by subtracting the Y from the blue signal of the original RGB, and V by subtracting the Y from the red. This can be accomplished easily with analog circuitry.

YUV 4:2:2 (also known as YUV 422) is a specific encoding for digital representation of the YUV color space. In YUV 4:2:2, the basic unit is composed of two pixels, and occupies four bytes of space. Each pixel has an individual 8 bit Y channel. Then, the first pixel specify an 8 bit U channel, and the second pixel an 8 bit V channel. Both pixels use the same U and V channels.

While an embodiment of the present invention is described using YUV 422, one of ordinary skill in the art will recognize that many different encoding schemes can be used for the pixel data, and thus the invention should not be limited to this one particular encoding scheme unless expressly claimed.

Figure 3:
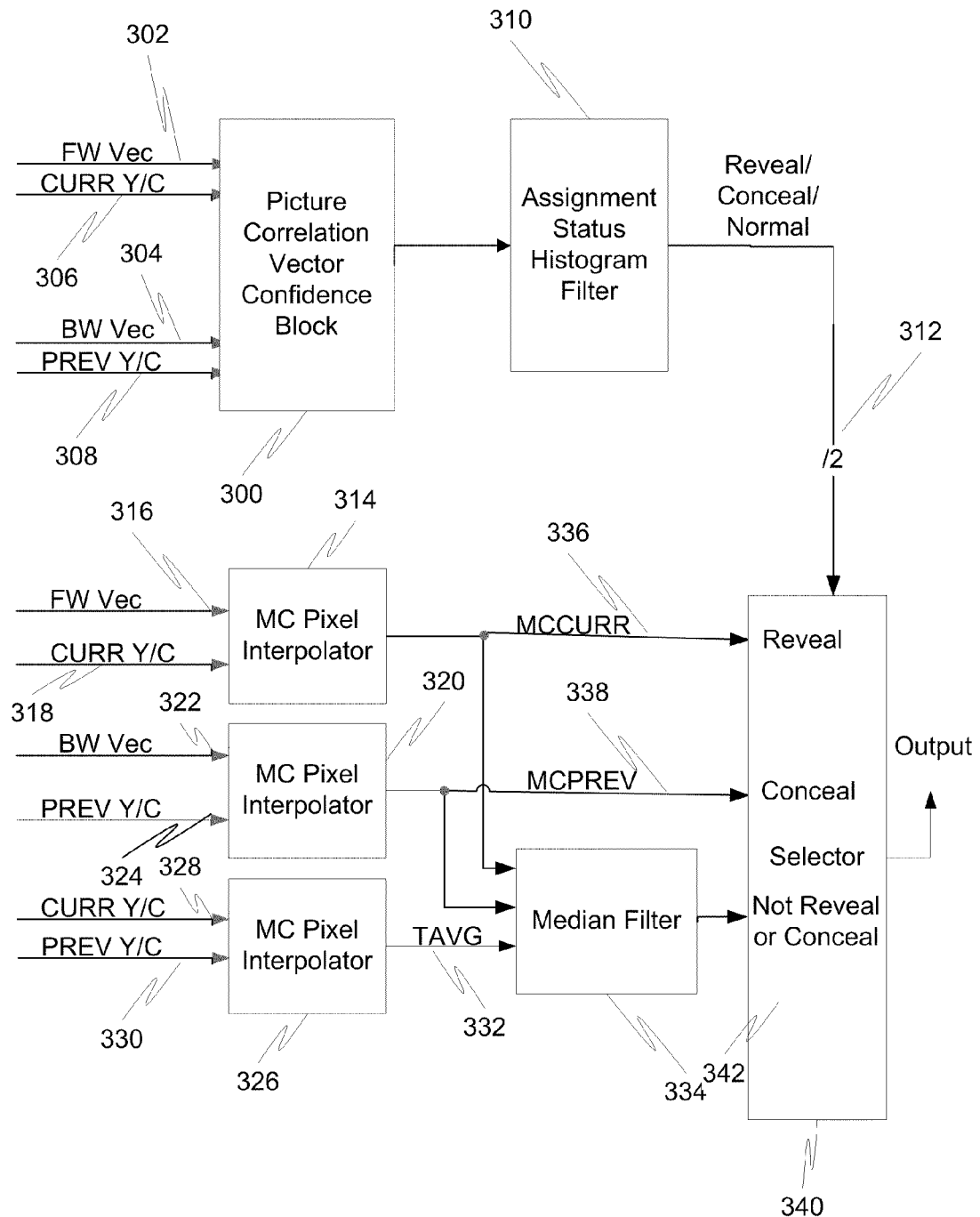
FIG. 3 is a block diagram illustrating a system for performing occlusion adaptive motion compensated temporal interpolation in accordance with an embodiment of the present invention.

FIG. 3 is a block diagram illustrating a system for performing occlusion adaptive motion compensated temporal interpolation in accordance with an embodiment of the present invention. A picture correlation vector confidence block 300 is used to detect reveal and conceal areas. The pixel correlation vector confidence block 300 checks for forward and backward vector accuracy on a pixel by pixel basis. It takes as input the forward and backward primary vectors 302, 304 and the YUV 422 pixel data from the CURR 306 and PREV 308 frames. It then outputs an "assignment_status" assigning four possible conditions to each pixel (non_converge, conceal, reveal, and normal).

For forward correlation, the reference pixel is taken from the PREV frame at the current xy coordinate and the motion compensated pixels is taken from the CURR frame by adding the forward vector x and y components to the current xy coordinate. In areas where the vectors are correct, the sum of the absolute differences of the Y, U. and V components of the two pixels (the forward frame difference) should be small. In conceal areas, the corresponding pixel in the CURR frame does not exist and the forward frame difference will probably be high.

For backward correlation, the reference pixel is taken from the CURR frame at the current xy coordinate and the motion compensated pixel is taken from the PREV frame by adding the backward vector x and y components to the current xy coordinate. In areas where the vectors are correct, the sum of absolute differences of the Y, U, and V components of the two pixels (the backward frame difference) should be small. In reveal areas, the corresponding pixel in the PREV frame does not exists and the backward frame difference will probably be high.

The "assignment_status" is derived from the forward and backward frame differences. Where both are above the high threshold, the status is "non_converge". Where the forward is above the high threshold and the backward is below the low threshold, the status is "conceal". Where the backward is above the high threshold and the forward is below the low threshold, the status is "reveal". Otherwise, the status is "normal."

This type of occlusion detection can be termed "full frame" (FF) occlusion detection. This will be contrasted later with an alternative type of occlusion detection that can be termed "interpolated frame" (IF) occlusion detection.

The assignment_status may have some degree of speckle noise, and therefore may need to be filtered. Speckle noise is characterized by erroneous values for essentially randomly placed pixels due to estimation error. The assignment_status is therefore input to an assignment status histogram filter 310, where it is so filtered. Since this embodiment is only concerned with whether the areas is reveal, conceal, or neither, the filtered_assignment_status 312 has three possible conditions for each pixel (conceal, reveal, and normal).

It should be noted that it is not necessary for the number of different levels of the conceal/reveal signal to be merely 3. As the filter is looking at the input results in a localized region, it can produce a graded signal indicating strong conceal, weak conceal, normal, weak reveal, or strong reveal. Indeed, this signal can actually be at any resolution, for example 33 different levels, from strong conceal to strong reveal. This is not depicted in the figure but it is an embodiment contemplated by this document.

A first motion compensated pixel interpolator 314 takes as input a forward vector 316 and the YUV 422 pixel data from the CURR frame 318. The vector is scaled to correspond to the fractional position of the interpolated frame (e.g., ⅓, ⅔). In one embodiment, the scaled vectors are a fixed point with a 5 bit fractional part. However, one of ordinary skill in the art will recognize that the vectors may be in any format and the invention should not be limited to this particular embodiment unless expressly claimed. Following the vector scaling, a 32 phase bilinear filter can be used to allow motion compensation to an accuracy of 1/32nd of a pixel. Again, one of ordinary skill in the art will recognize that this is just one example of a filter that can be utilized for motion compensation, and that the invention should not be limited to this particular example unless expressly claimed.

A second motion compensated pixel interpolator 320 takes as input a backward vector 322 and the YUV 4:2:2 pixel data from the PREV frame 324. As with above, the vector is scaled to correspond to the fractional position of the interpolated frame (e.g., ⅓, ⅔), and the scaled vectors may be fixed point with a 5 bit fractional part. Then a 32 phase bilinear filter may be used to allow motion compensation to an accuracy of 1/32nd of a pixel.

A temporal average pixel interpolator 326 takes an average of the YCC 422 information from the PREV 328 and CURR 330 frame pixels, weighted according to the temporal position of the interpolated frame. For example, for the ⅓ interpolated frame, the PREV frame makes a ⅔ contribution and the CURR frame makes a ⅓ contribution. The output is the temporal average pixel 332.

A median filter 334 finds the median of the motion compensation CURR pixel 336, the motion compensated PREV pixel 338, and the temporal average pixel 332.

A selector 340 then takes as input the motion compensated CURR pixel 336, the motion compensated PREV pixel 338, and the median 342 from the median filter 334 and selects between them based upon whether the output 312 from the assignment status histogram filter 310 is a reveal, a conceal, or neither. Thus, in reveal areas, the Motion Compensated Current (MCCURR) pixel is selected, in conceal areas, the Motion Compensated Previous (MCPREV) pixel is selected, and everywhere else, the MEDIAN pixel is selected. In the case where a 33 level filtered assignment status is utilized, blending may occur between the MCCURR, MCPREV, and MEDIAN pixels.

Figure 4:
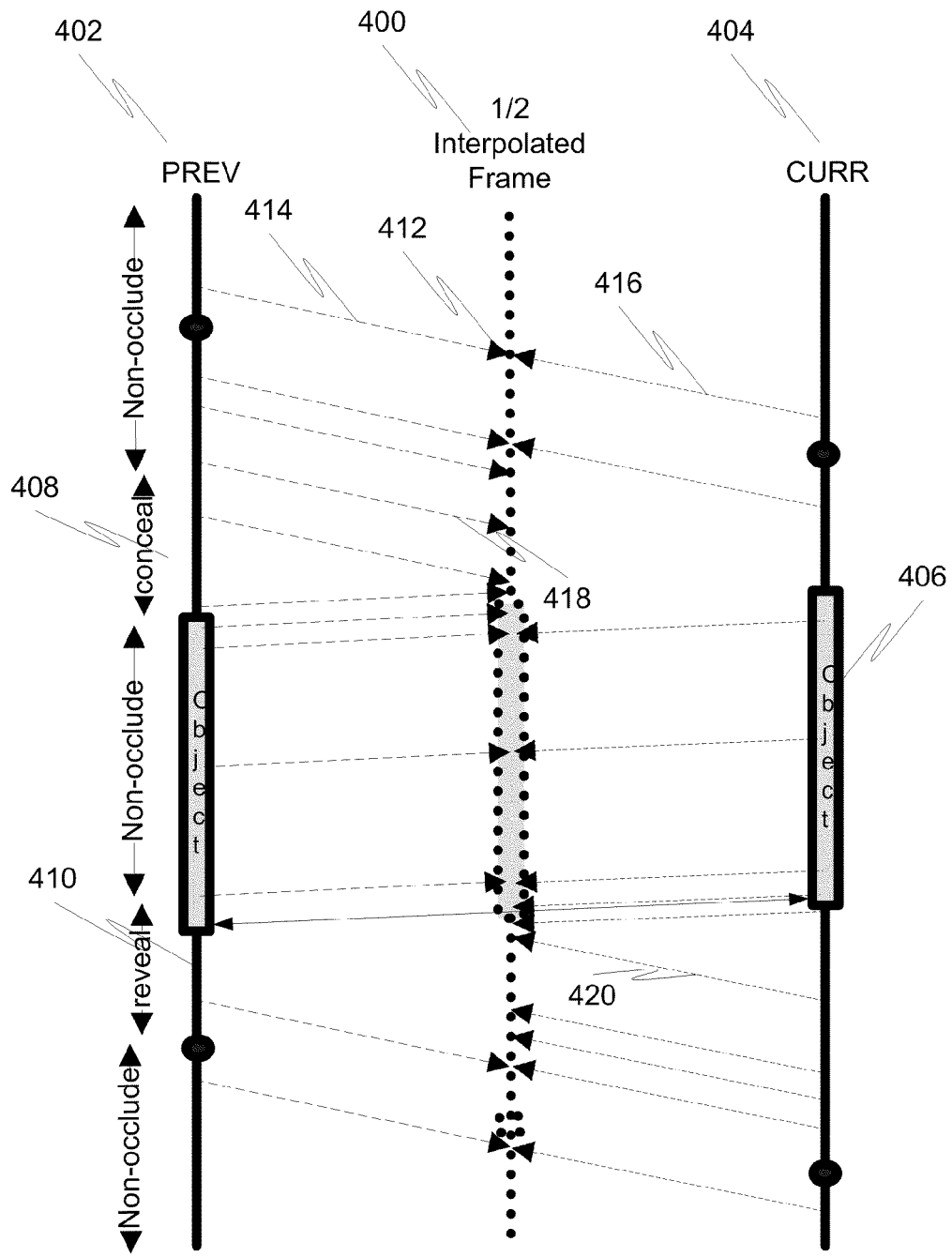
FIG. 4 is a diagram illustrating the results of interpolation using the first embodiment of the present invention.

FIG. 4 is a diagram illustrating the results of interpolation using the first embodiment of the present invention. Specifically, FIG. 4 shows a case where the background is moving downwards significantly but the foreground is near stationary. In this case, the output picture is near ideal, with the correct background information being inserted in the occlusion areas. Indeed, if the background was completely stationary, the output picture would be ideal.

It should be noted that this figure represents a simplification of actual movement on a computer display, in order to better illustrate how the first embodiment of the present invention operates. Specifically, only one interpolated frame 400 is depicted (exactly midway between the PREV 402 and CURR frame 404). Additionally, movement is only being depicted in one direction (along a single access). An actual computer display, however, has two dimensions and thus movement is more commonly seen across multiple axis simultaneously.

Nevertheless, as can be seen, object 406 moves upwards between PREV frame 402 and CURR frame 404. Thus, a conceal region 408 is created where pixels in the background on the PREV frame 402 have no corresponding match in the CURR frame 404 (because object 406 has moved upwards to block this portion of the background). Note that the conceal region 408 is actually larger than the absolute difference in location of the object from the PREV frame 402 to the CURR frame 404 because the background is also moving downwards. Since the background is moving quite significantly, the conceal region is actually significantly larger than it would have been if the background was stationary.

Likewise, a reveal region 410 is created where pixels in the background on the CURR frame 404 have no corresponding match in the PREV frame 402 (because object 406 has moved upwards to reveal this potion of the background).

The interpolated frame is then calculated based upon the first embodiment of the present invention. For each pixel in a non-occluded area 412, a backward vector 414 applied to a pixel in the PREV frame 402 is used to calculate a pixel value for the interpolated frame. Likewise, a forward vector 416 applied to a pixel in the CURR frame 404 is used to calculate a pixel value for the interpolated frame. A temporal average pixel (not pictured) is then also calculated, and the median of these three calculations is used as the value for the interpolated frame.

For each pixel of the conceal region 408, a backward vector 418 applied to a pixel in the PREV frame 402 is used to calculate a pixel value and that is the value that is used for the interpolated frame (no motion compensated current pixel needs to be calculated nor does a temporal average pixel need to be calculated, although embodiments are possible where these values are computed and simply discarded).

For each pixel of the reveal region 410, a forward vector 420 applied to a pixel in the CURR frame 404 is used to calculate a pixel value and that is the value that is used for the interpolated frame (no motion compensated previous pixel needs to be calculated nor does a temporal average pixel need to be calculated, although embodiments are possible where these values are computed and simply discarded). Of course, as described above, blending may also occur at this point.

Figure 5:
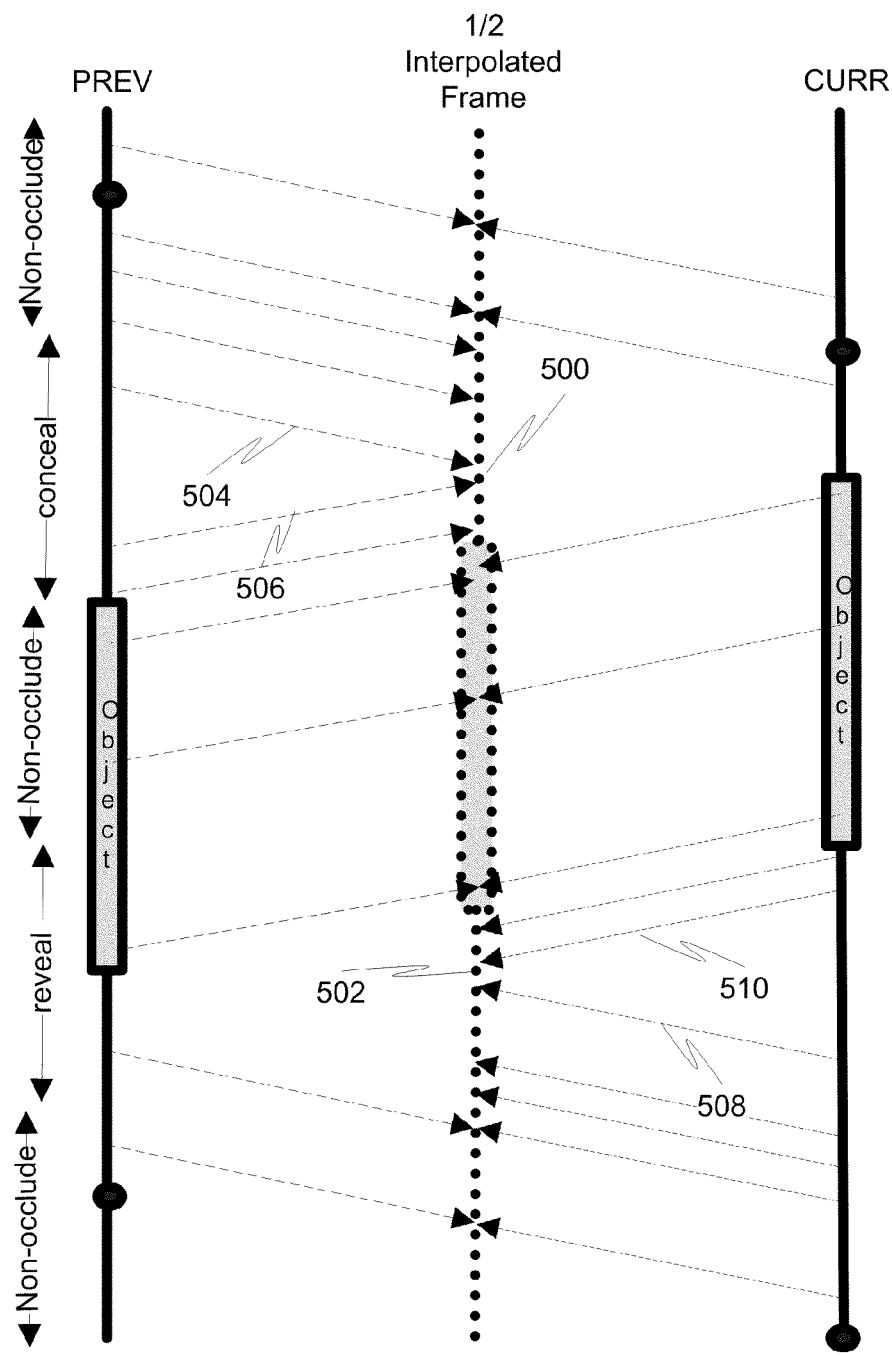
FIG. 5 is another diagram illustrating results of interpolation using the first embodiment of the present invention.

FIG. 5 is another diagram illustrating results of interpolation using the first embodiment of the present invention. Specifically, FIG. 5 shows a case where the background is moving significantly and the foreground is also moving significantly, but in a different direction. In this case the output picture is good, but not great. Specifically, background information inserted in the occlusion areas improves the picture, however, there is discontinuity in the background picture. This discontinuity can be seen at areas 500 and 502. At area 500, the discontinuity occurs because the system is unable to determine whether to use a backward vector 504 computed based on the background movement or a backward vector 506 computed based on the object movement. Likewise, at area 502, the discontinuity occurs because the system is unable to determine whether to use a forward vector 508 computed based on the background movement or a forward vector 510 computed based on the object movement. In this case, however, because the object is moving significantly, the position of the occlusion area is also moving on a frame by frame basis so the discontinuity will not be very noticeable.

Figure 6:
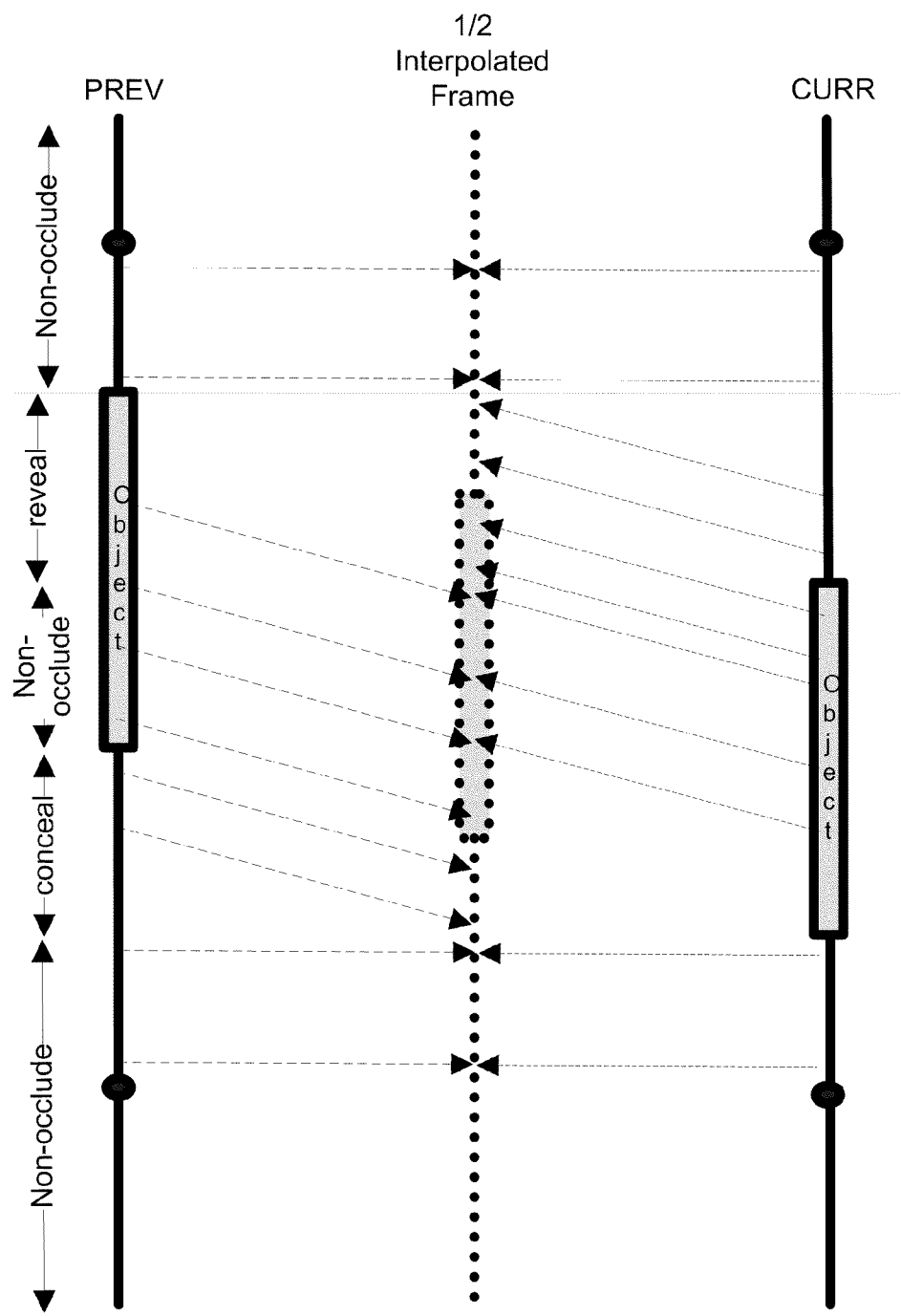
FIG. 6 is another diagram illustrating results of interpolation using the first embodiment of the present invention.

FIG. 6 is another diagram illustrating results of interpolation using the first embodiment of the present invention. Specifically, FIG. 6 shows a case where the background is stationary and the foreground is moving significantly. In this case, the output picture is similar to FIG. 5, where the background information is inserted in the occlusion areas but there is discontinuity in the background at the edge of the occlusion areas. As the object is moving significantly, the position of the occlusion area is also moving on a frame by frame basis so the discontinuity will not be very noticeable.

Figure 7:
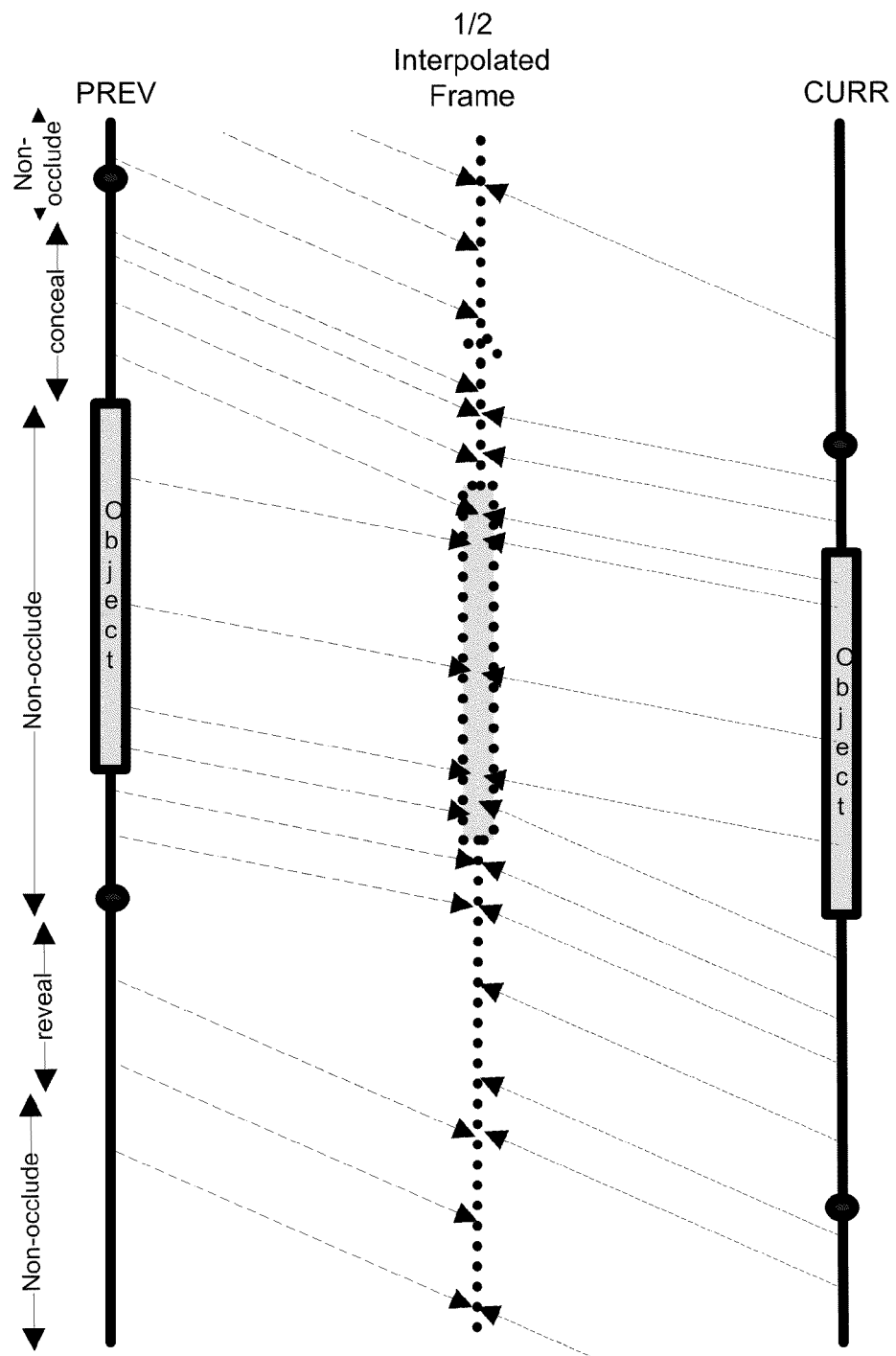
FIG. 7 is another diagram illustrating results of interpolation using the first embodiment of the present invention.

FIG. 7 is another diagram illustrating results of interpolation using the first embodiment of the present invention. Specifically, FIG. 7 shows a case where the object is moving in the same direction as the background but not as fast. This shows that errors will occur on both the background and the object near the object/background boundary. As this is not an occlusion area, the median filter output will be selected. The errors introduced in this type of situation can be handled by another embodiment of the present invention described later in this document.

Thus, the first embodiment of the present invention provides a cheap and effective solution to halo reduction in cases of a slow moving foreground.

Figure 8:
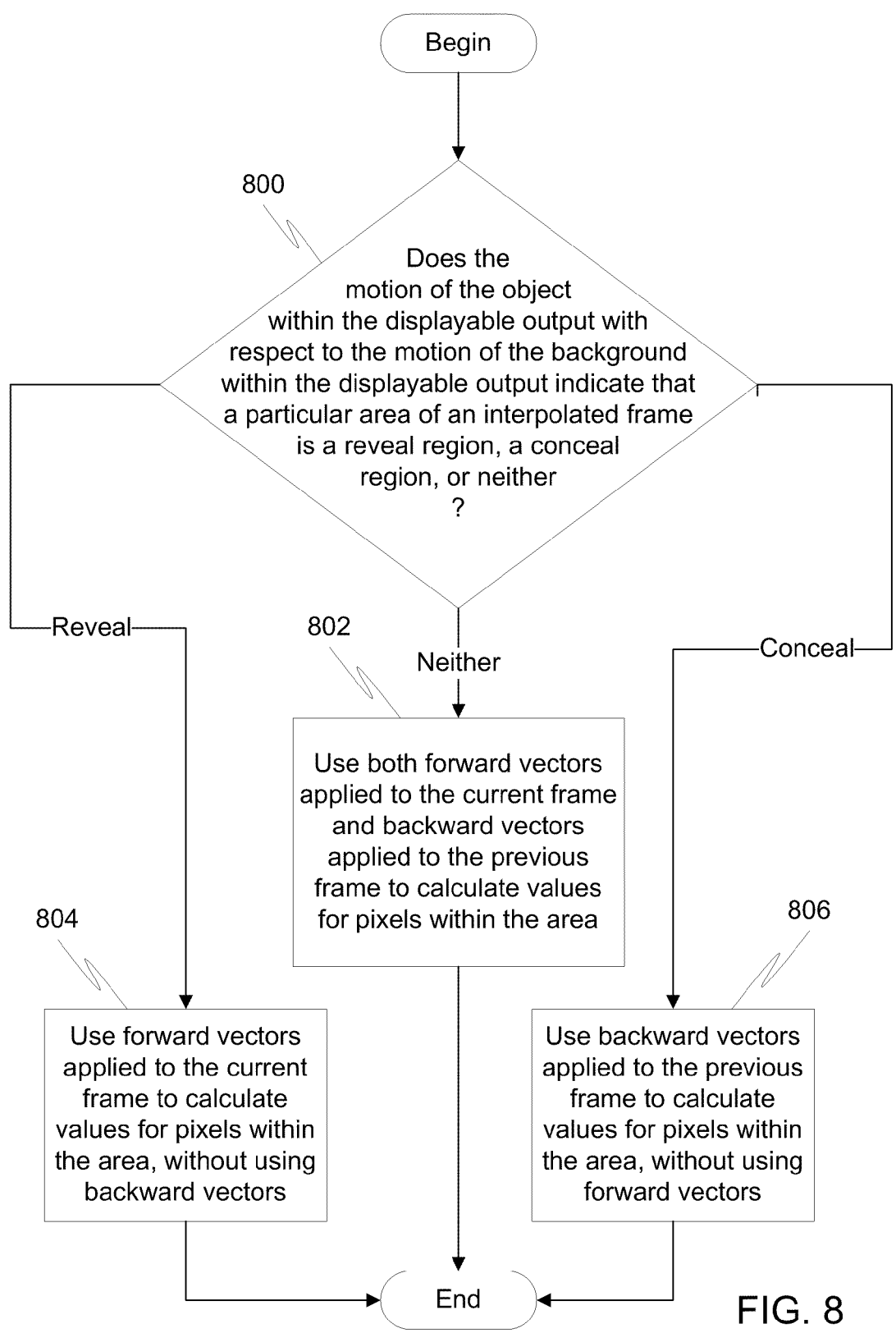
FIG. 8 is a flow diagram illustrating a method for performing motion compensated interpolation in accordance with the present invention.

FIG. 8 is a flow diagram illustrating a method for performing motion compensated interpolation in accordance with the present invention. This method may be performed by, for example, a computer chip in a display controller. The display controller may be located in, for example, a Liquid Crystal Display (LCD) television or other display device. This method may use a previous frame and a current frame of a displayable output to arrive at an interpolated frame.

At 800, it is determined if motion of an object within the displayable output with respect to motion of a background within the displayable output is such that a particular area of an interpolated frame is a reveal region, a conceal region, or neither. A reveal region may be an area where the pixels in the current frame do not have matches in the previous frame. A conceal region may be an area where the pixels in the previous frame do not have matches in the current frame.

If the area is neither a reveal region nor a conceal region, then at 802 both forward vectors applied to the current frame and backward vectors applied to the previous frame are used to calculate values for pixels within the area. In one embodiment this may be accomplished by using a three tap median filter to find the median of a motion compensated pixel from the previous frame, a motion compensated pixel from the current frame, and a temporal average pixel.

If the area is a reveal region, then at 804, forward vectors applied to the current frame are used to calculate values for pixels within the area, without using backward vectors. In situations where the temporal average pixel has also been generated, this also may not be used to calculate values for pixels within the reveal region.

If the area is a conceal region, then at 806, backward vectors applied to the previous frame are used to calculate values for pixels within the area, without using forward vectors. In situations where the temporal average pixel has also been generated, this also may not be used to calculate values for pixels within the conceal region.

As described above, blending may occur at this point as well. This blending is not depicted in the flow diagram but is an embodiment that is contemplated by this document.

It should be noted that the forward and backward vectors, when used, may be weighted based on their respective temporal distances from the interpolated frame. For example, if the interpolated frame is at ⅓ of the period from the previous frame and ⅔ of the period from the current frame, then the forward vector may be weighted by ⅔ and the backward vector by ⅓.

Due to the first embodiment of the present invention's ability to reduce halo artifacts, this embodiment may also be called a halo reducing interpolator and its processes halo reducing interpolation.

In a second embodiment of the present invention, the limitations of the first embodiment of the present invention with respect to fast moving foreground objects are dealt with. Specifically, the relative speed at which the object is moving is measured. Based on the relative speed of the object, the halo reducing interpolator according to the first embodiment of the present invention is blended with a median interpolator. The faster the object is moving, the less the halo reducing interpolator is used and the more the median interpolator is used. The slower the object is moving, the more the halo reducing interpolator is used and the less the median interpolator is used.

It should be noted that the halo reducing interpolator according to the first embodiment of the present invention need not be the exact interpolator used as part of this blending. Any interpolator that performs halo reducing interpolation yet suffers from limitations at high object speeds may be utilized. As such, one of ordinary skill in the art will recognize that the invention should not be limited to one particular type of halo reducing interpolator unless expressly claimed.

In the second embodiment of the present invention, an object speed weighted interpolation mode may utilize a fade control signal indicating the level of halo reduced interpolation that should be performed. In one embodiment of the present invention, this control signal is a 4-bit signal with values from 0 (full median interpolation) to 8 (full halo reduction interpolation). This may be generated in firmware and updated at the start of each frame. It should be noted that this scale is merely one example of a blending scale that can be utilized with the second embodiment of the present invention, and that one of ordinary skill in the art will recognize that other scales and data structures may be utilized for this signal.

The system can detect when there is a fast moving object or no object at all. This may be performed by, for example, firmware stored on a storage device within the system. In these cases, the interpolator is set to median mode. When the fastest object detected is slow moving, a blender fades back to the adaptive halo reduction interpolation mode. The fade value depends on the object speed.

In an embodiment of the present invention, detection of the speed of objects is accomplished by creating a two dimensional histogram of the motion vector field with the dimensions corresponding to the vertical and horizontal components of background and object motion vectors. Only vectors with a higher confidence of being correct are accumulated in the histogram, with the others being ignored or given a lower weighting by a filtering process.

The two dimensional histogram field is analyzed for dominant vectors. The bin with the highest count is taken first. The neighboring bins are assumed to be associated with this bin, which is assumed to relate to the background.

Bins near the bins corresponding to the background are then ignored and the remaining bins are analyzed to detect objects. If an object is detected (by having a count above a threshold) then the closest neighbors are assumed to also correspond to that object.

Essentially, the system looks for a large number of vectors in a particular direction. The largest grouping of such vectors is classified as the background. In this manner, an estimation is made of the background motion and the motion of any objects. If there are no objects detected, as in the case where there is a panning movement through an image, then median interpolation may be used.

By blending median interpolation and halo reduction interpolation, the drawbacks of using either method alone in certain situations is greatly reduced.

Figure 9:
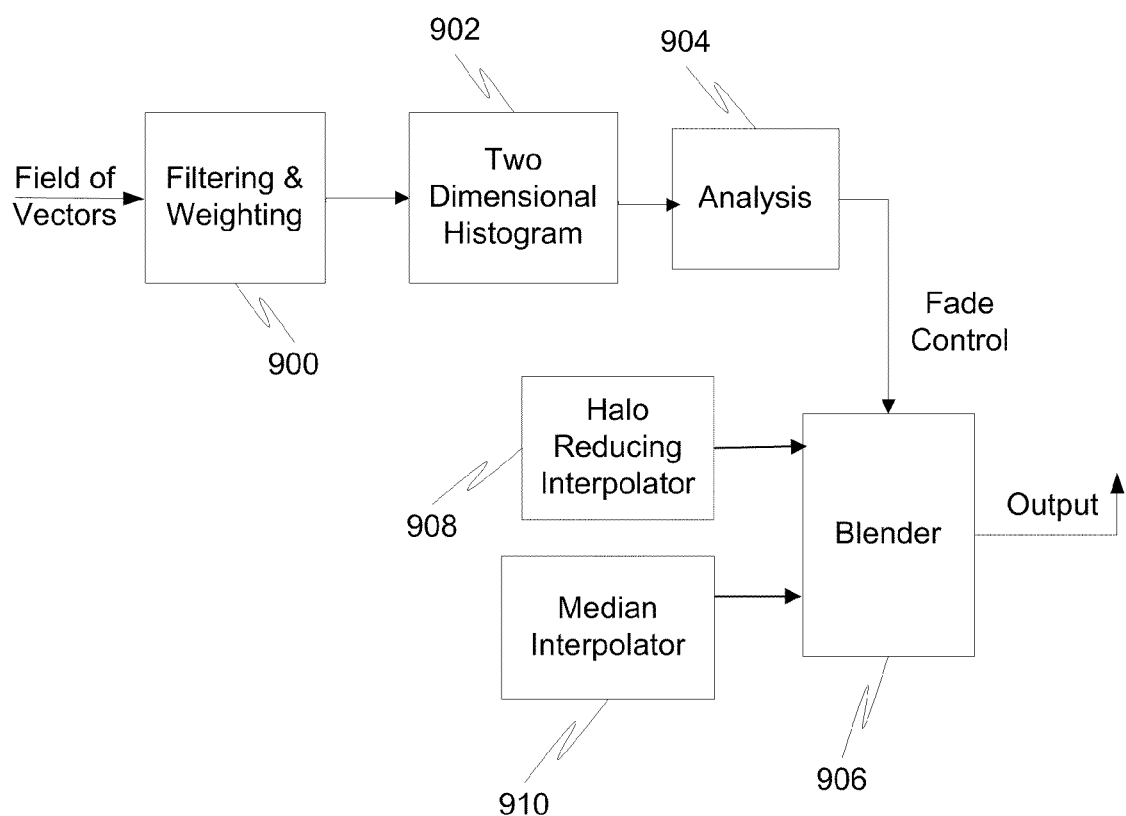
FIG. 9 is a block diagram illustrating an interpolation system in accordance with the second embodiment of the present invention.

FIG. 9 is a block diagram illustrating an interpolation system in accordance with the second embodiment of the present invention. A filtering and weighting unit 900 performs filtering and weighting on a field of input vectors. Those filtered and weighted vectors are then fed to a two dimensional histogram generator 902 that generates a two dimensional histogram of the vectors. An analysis unit 904 then analyzes the histogram for dominant vectors and estimates the background motion and the motion of any objects. Through this, a fade control signal can be generated based on the relative speed of an object. This fade control signal is fed to a blender 906, which blends output from a halo reducing interpolator 908 and a median interpolator 910 based upon the relative speed of an object.

Figure 10:
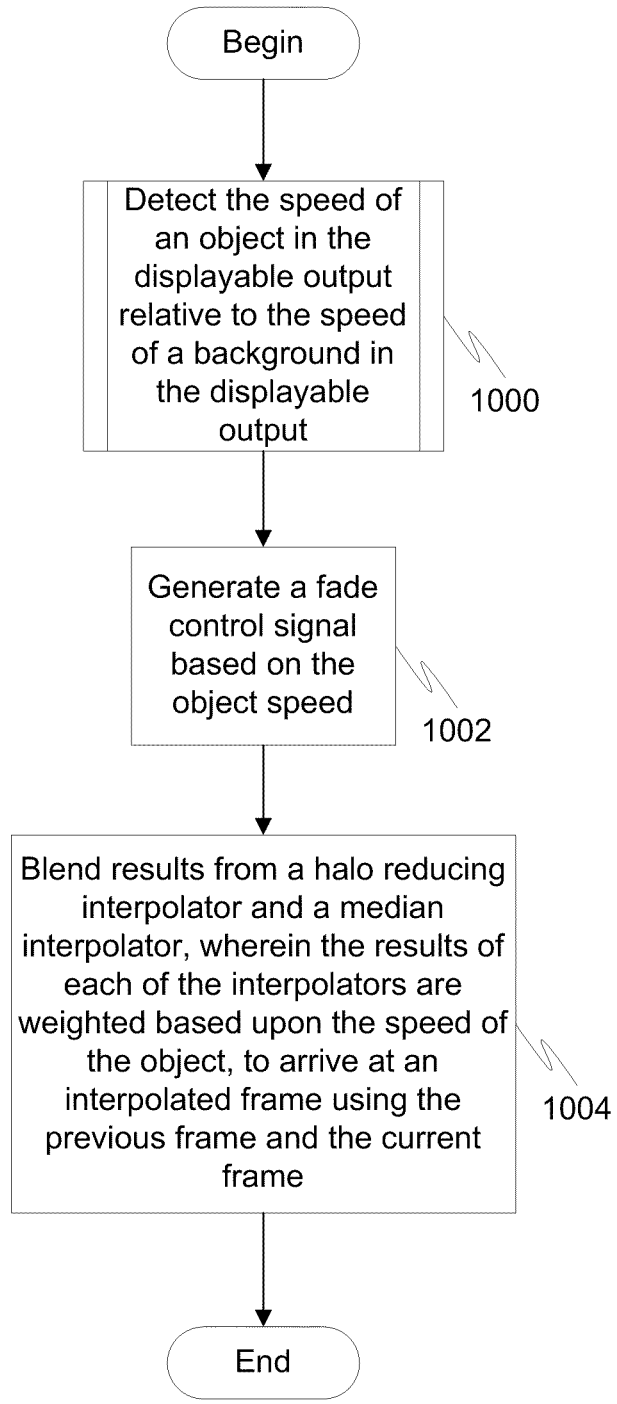
FIG. 10 is a flow diagram illustrating a method for performing motion compensated interpolation using a previous frame and current frame of the displayable output in accordance with the second embodiment of the present invention.
Figure 11:
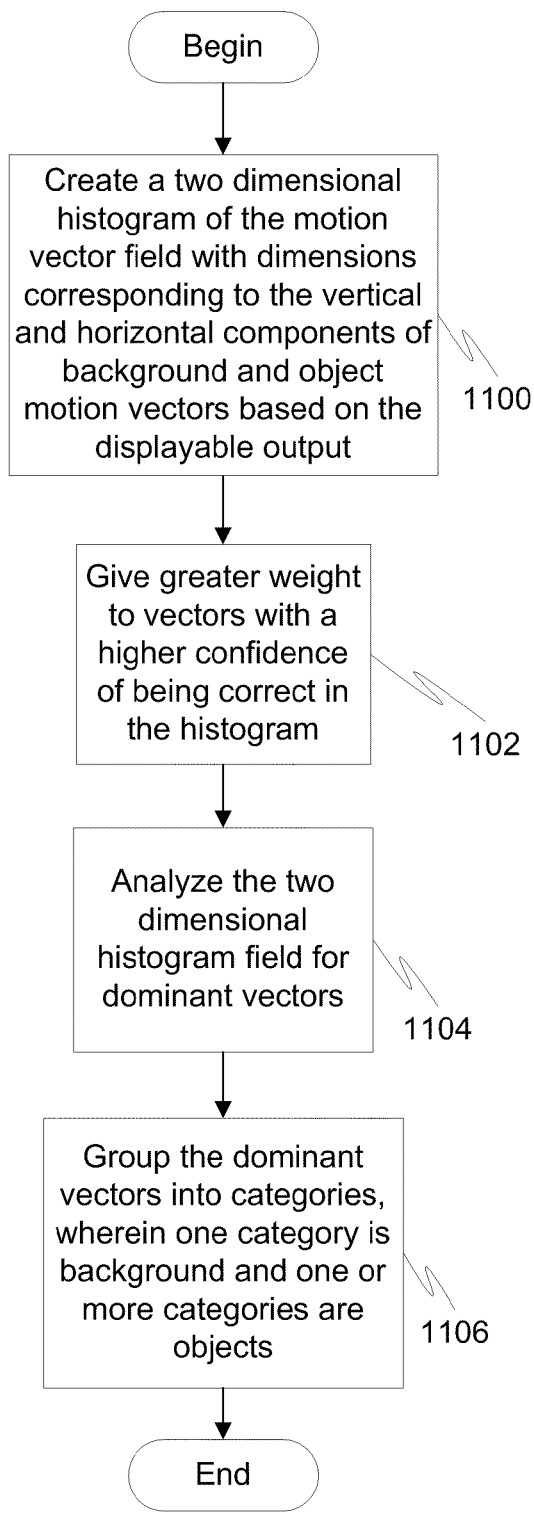
FIG. 11 is a flow diagram illustrating a method for detecting the speed of an object in the displayable output relative to the speed of a background in the displayable output in accordance with the second embodiment of the present invention.

FIG. 10 is a flow diagram illustrating a method for performing motion compensated interpolation using a previous frame and current frame of the displayable output in accordance with the second embodiment of the present invention. At 1000, the speed of an object in the displayable output relative to the speed of a background in the displayable output is detected. This detection may be performed by using a method in accordance with the flow diagram illustrated in FIG. 11. Here, at 1100, a two-dimensional histogram of the motion vector field is created with dimensions corresponding to the vertical and horizontal components of background and object motion vectors is created based on the displayable output. At 1102, greater weight is given to vectors with a higher confidence of being correct in the histogram. At 1104, the two dimensional histogram field is analyzed for dominant vectors. At 1106, the dominant vectors are grouped into categories, wherein one category is background and one or more categories are objects.

Referring back to FIG. 10, at 1002, a fade control signal is generated based on the object speed. At 1004, results from a halo reducing interpolator and a median interpolated are blended, wherein the results of each of the interpolators are weighted based upon the speed of the object, to arrive at an interpolated frame using the previous frame and the current frame. The higher the object speed, the higher the results of the median interpolator are weighted, and the lower the results of the halo reducing interpolator are weighted.

The artifacts caused by discontinuity, which were described earlier with respect to the first embodiment of the present invention, can be further reduced by using a pre-emphasis filter to boost the higher frequencies by a large amount. A de-emphasis filter then restores a flat frequency response after interpolation is performed. The advantage is that sharp discontinuity interpolation artifacts typically produced in occlusion areas are very effectively smoothed by the de-emphasis filter.

In certain types of scenes, the pre-emphasis itself can add aliasing artifacts to high-frequency areas. Therefore, it is desirable that the pre-emphasis only be turned on when needed. As such, the pre-emphasis may be weighted by object speed in much the same way that halo reducing interpolation can be weighted by object speed. The strength of the pre-emphasis can be reduced as the relative speed of the object with respect to the background is reduced.

Figure 12:
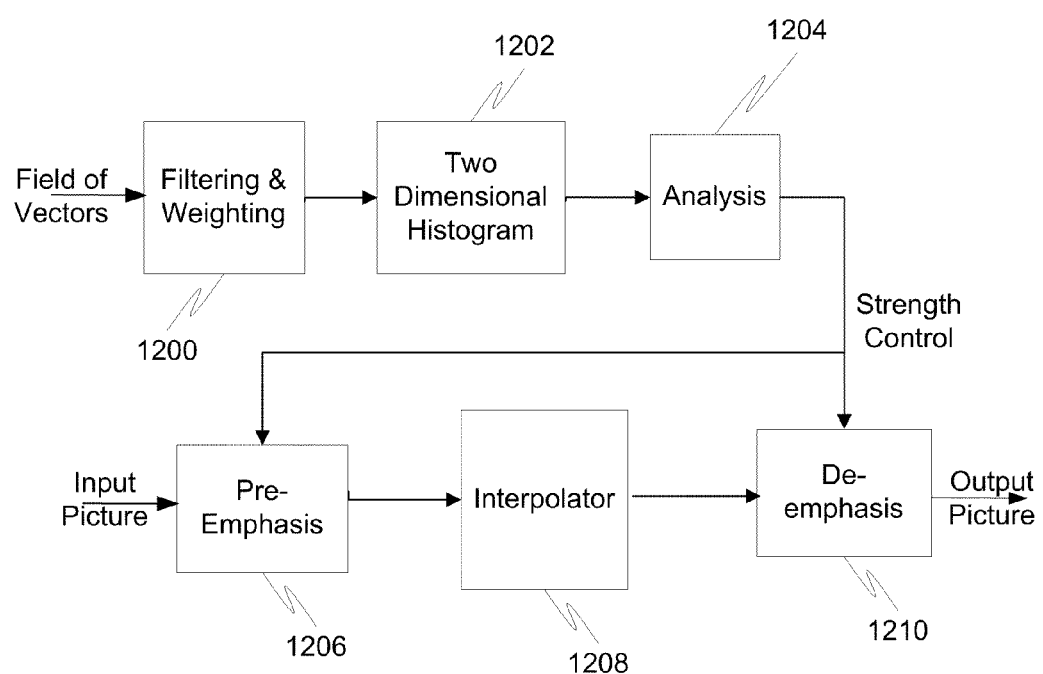
FIG. 12 is a block diagram illustrating another interpolation system in accordance with the second embodiment of the present invention.

FIG. 12 is a block diagram illustrating another interpolation system in accordance with the second embodiment of the present invention. Here, a filtering and weighting unit 1200 performs filtering and weighting on a field of input vectors. Those filtered and weighted vectors are then fed to a two dimensional histogram generator 1202 that generates a two dimensional histogram of the vectors. An analysis unit 1204 then analyzes the histogram for dominant vectors and estimates the background motion and the motion of any objects. Through this, a fade control signal can be generated based on the relative speed of an object. This fade control signal is fed to both a pre-emphasis unit 1206 and a de-emphasis unit 1210, which adjusts the amount of pre-emphasis performed prior to an interpolator 1208, as well as the amount of de-emphasis performed after the interpolator 1208, based on the fade control signal. The faster the object, the stronger the pre-emphasis (and thus the stronger the amount of de-emphasis needed in order to restore a flat frequency response).

Figure 13:
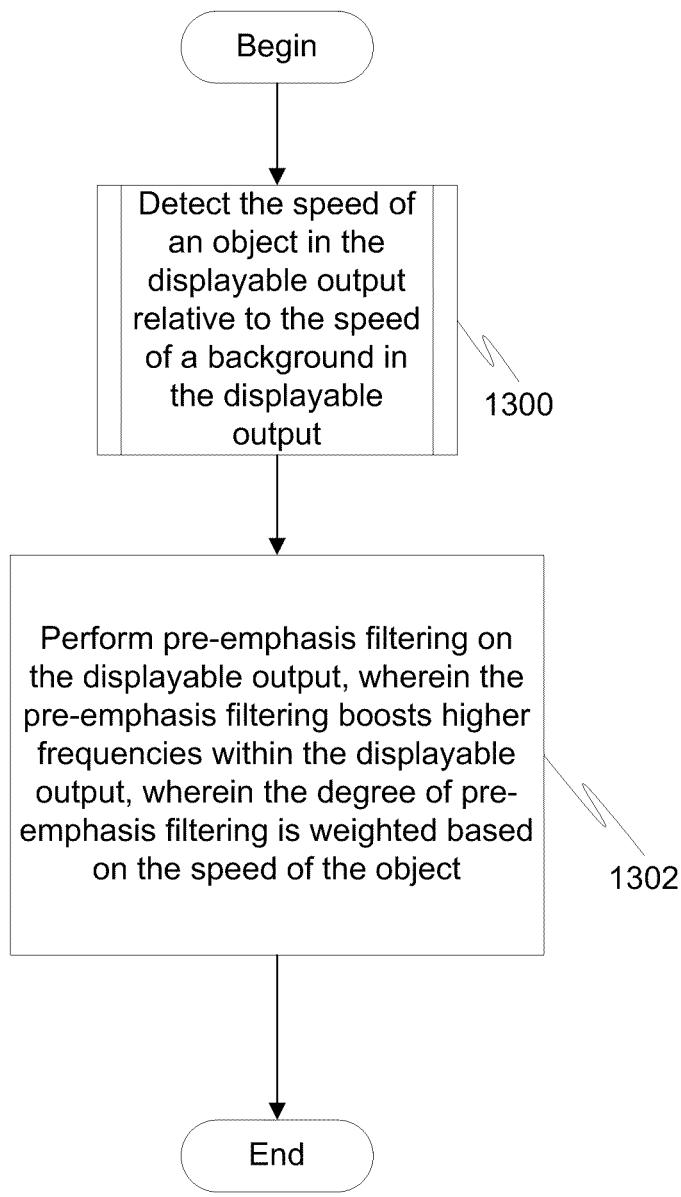
FIG. 13 is a flow diagram illustrating another method for performing motion compensated interpolation using a previous frame and current frame of the displayable output in accordance with the second embodiment of the present invention.

FIG. 13 is a flow diagram illustrating another method for performing motion compensated interpolation using a previous frame and current frame of the displayable output in accordance with the second embodiment of the present invention. At 1300, the speed of an object in the displayable output relative to the speed of a background in the displayable output is detected. This detection may be performed by using a method in accordance with the flow diagram illustrated in FIG. 11.

At 1302, pre-emphasis filtering is performed on the displayable output, wherein the pre-emphasis filtering boosts higher frequencies within the displayable output, wherein the degree of pre-emphasis filtering is weighted based on the speed of the object. The higher the speed of the object, the higher the degree of pre-emphasis filtering.

Figure 14:
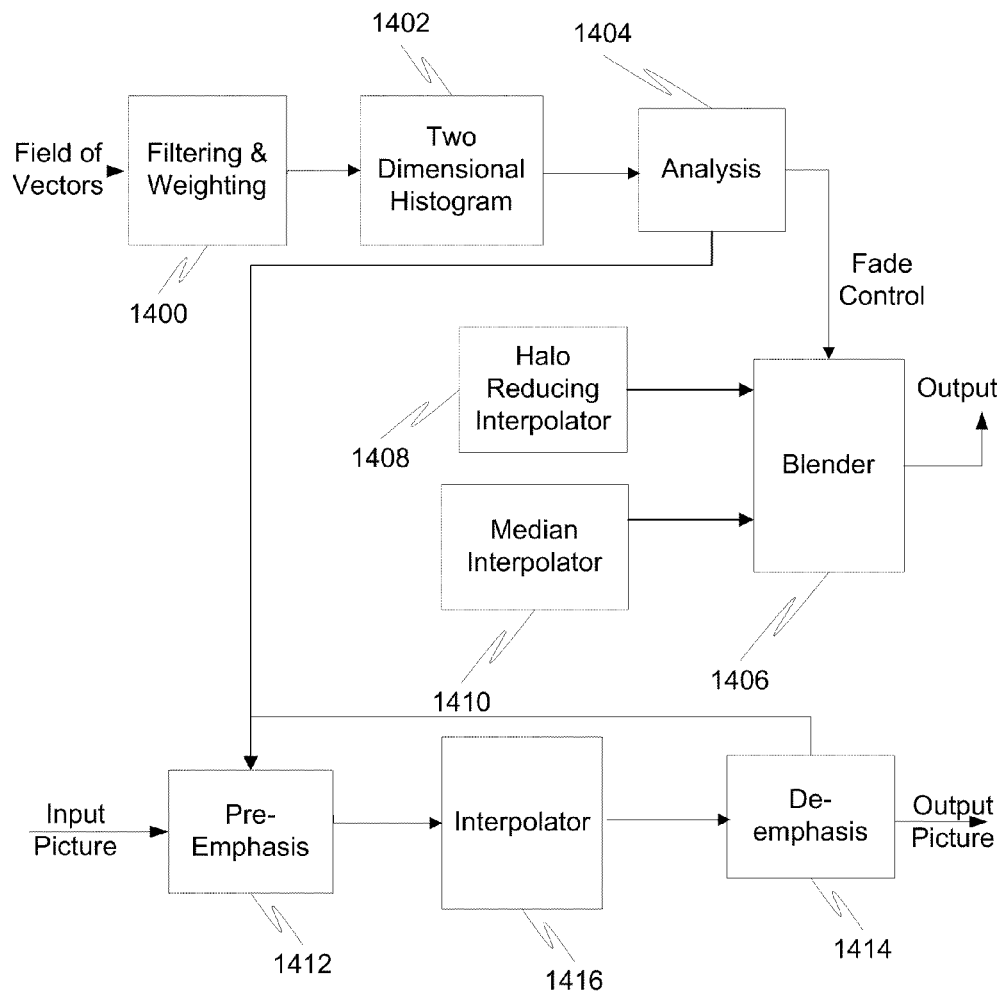
FIG. 14 is a block diagram illustrating a combined interpolation system in accordance with the second embodiment of the present invention.

FIG. 14 is a block diagram illustrating a combined interpolation system in accordance with the second embodiment of the present invention. FIG. 14 essentially represents a combination of FIGS. 9 and 12.

A filtering and weighting unit 1400 performs filtering and weighting on a field of input vectors. Those filtered and weighted vectors are then fed to a two dimensional histogram generator 1402 that generates a two dimensional histogram of the vectors. An analysis unit 1404 then analyzes the histogram for dominant vectors and estimates the background motion and the motion of any objects. Through this, a fade control signal can be generated based on the speed of an object. This fade control signal is fed to a blender 1406, which blends output from a halo reducing interpolator 1408 and a median interpolator 1410 based upon the speed of an object. A separate fade control signal is also fed to both a pre-emphasis unit 1412 and a de-emphasis unit 1414, which adjusts the amount of pre-emphasis performed prior to an interpolator 1416, as well as the amount of de-emphasis performed after the interpolator 1416, based on the fade control signal. The faster the object relative to the background, the stronger the pre-emphasis (and thus the stronger the amount of de-emphasis needed in order to restore a flat frequency response).

Figure 15:
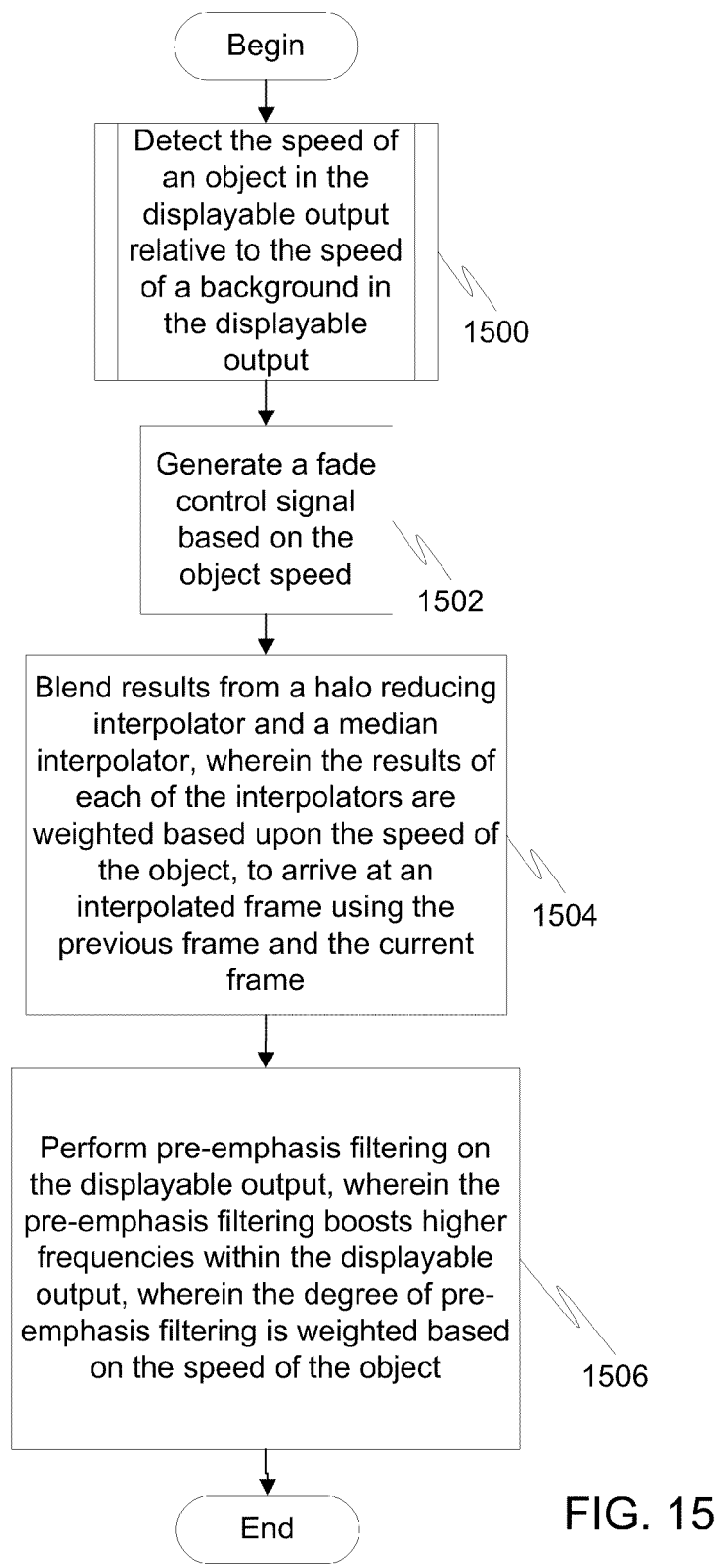
FIG. 15 is a flow diagram illustrating a combined method for performing motion compensated interpolation using a previous frame and current frame of the displayable output in accordance with the second embodiment of the present invention.

FIG. 15 is a flow diagram illustrating a combined method for performing motion compensated interpolation using a previous frame and current frame of the displayable output in accordance with the second embodiment of the present invention. FIG. 15 essentially represents a combination of FIGS. 10 and 13.

At 1500, the speed of an object in the displayable output relative to the speed of a background in the displayable output is detected. This detection may be performed by using a method in accordance with the flow diagram illustrated in FIG. 11. At 1502, a fade control signal is generated based on the object speed. At 1504, results from a halo reducing interpolator and a median interpolated are blended, wherein the results of each of the interpolators are weighted based upon the speed of the object, to arrive at an interpolated frame using the previous frame and the current frame. The higher the relative speed, the higher the results of the median interpolator are weighted, and the lower the results of the halo reducing interpolator are weighted.

At 1506, pre-emphasis filtering is performed on the displayable output, wherein the pre-emphasis filtering boosts higher frequencies within the displayable output, wherein the degree of pre-emphasis filtering is weighted based on the speed of the object. The higher the speed of the object, the higher the degree of pre-emphasis filtering.

Figure 16:
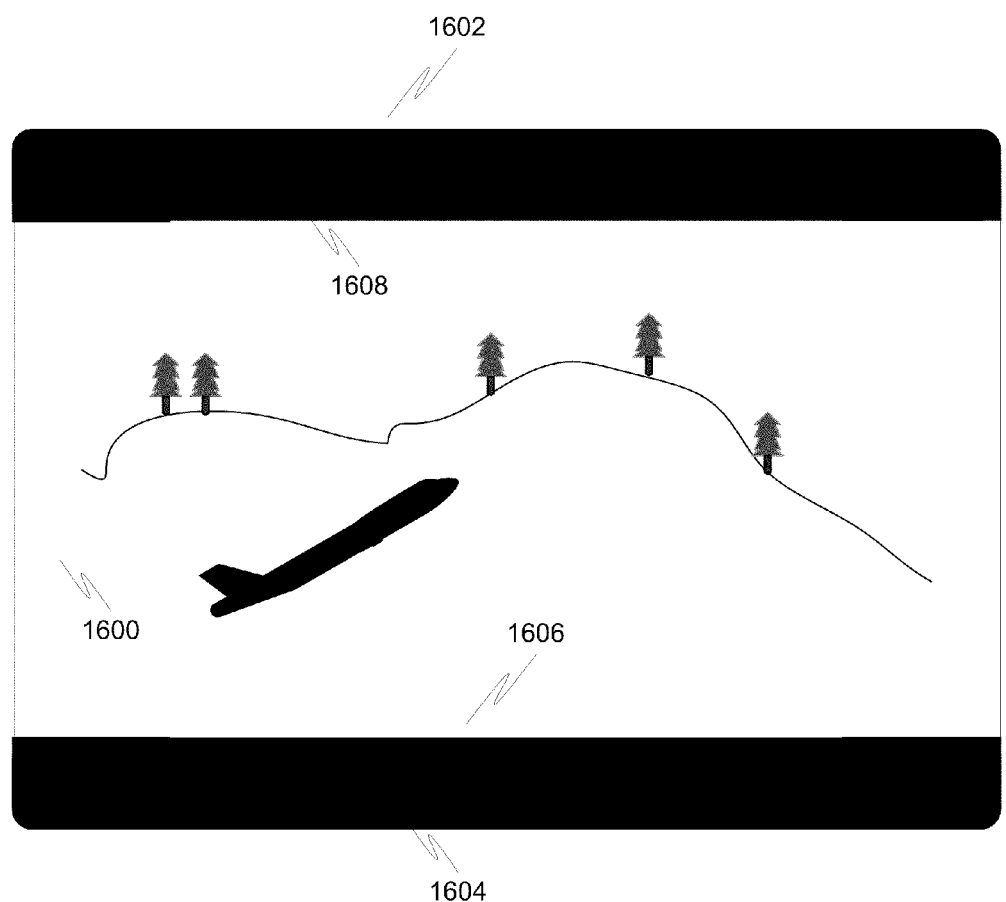
FIG. 16 is an example of video content in a letterbox region
Figure 17:
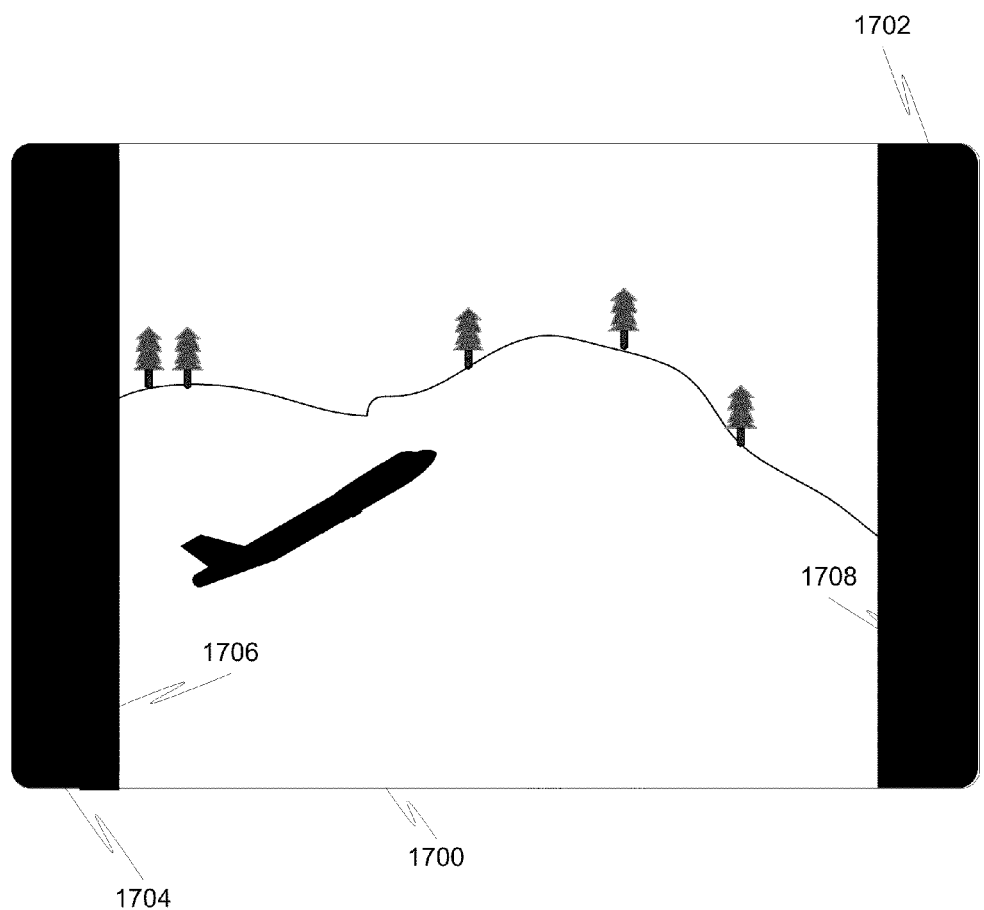
FIG. 17 is an example of video content in a pillarbox region.

The halo occlusion artifacts described earlier also tend to cluster around the borders of a picture when there are fast pans. FIGS. 16 and 17 depict an example of this. In FIG. 16, the actual video content is displayed in a letterbox region 1600 on the screen. Regions 1602 and 1604 remain black throughout the video. Such letterbox presentations are common, for example, when displaying a movie in its original theatrical format on a 4:3 display, such as an older television set. Such letterbox presentations are also common even on the more recent 16:9 displays when the original theatrical format of the movie has a higher aspect ratio, such as 2.35:1. The letterboxing creates a visible border 1606, 1608 above and below the video content.

In FIG. 17, the actual video content is displayed in a pillarbox region 1700 on the screen. Regions 1702 and 1704 remain black throughout the video. Such pillarbox presentations are common, for example, when displaying 4:3 content on a 16:9 television. The pillarboxing creates a visible border 1706, 1708 on either side of the video content.

The problem is that if there are quick pans, haloing artifacts appear along the visible borders. The problem is more prevalent for vertical pans of a letterbox image and horizontal pans of a pillarbox image. The problem is caused by motion compensation algorithms making errors around these edges.

In a third embodiment of the present invention, a camera model detects the predominant pan, rotation, and zoom parameters in a moving sequence. This information is then used to calculate a field of vectors that approximates the average motion over the whole frame. The approximate reveal or conceal areas on each edge of the frame to be interpolated are then calculated. The interpolator can use this to pull a pixel from the appropriate input frame when assembling this region. This camera model may be used in portions of the displayable area near the borders described above (the areas determined to be reveal or conceal areas), and aid in reducing or even eliminating the haloing issues caused by errors in other motion compensation algorithms.

The camera model may not, however, work very well if the movement is not caused by a pan, rotation, or zoom in a moving sequence (i.e., what appears to be a camera movement across a scene), but rather is caused by an object moving near one of the borders (e.g., a foreground object passing into or out of the frame). As such, in one embodiment of the present invention, this type of object movement is detected and if the reveal or conceal area is caused by object motion rather than camera motion, the camera model is not used for interpolation in the corresponding region.

This is performed by checking the area near each edge to ensure there are not many reliable vectors in the actual vector field that are different from the calculated vector field using the camera model. In this case, there is a foreground object near the edge, and the camera model border handling will be disabled on that edge.

It should be noted that the detection of a reveal region or a conceal region is different than that as described above with respect to the first embodiment of the present invention. There, the reveal or conceal areas was caused by movement of an object with respect to the background of an image. Here, a reveal area has to do with an area that was not displayed at all in the previous frame, and a conceal area has to do with an area that is no longer displayed in the current frame even though it was in a previous frame. It should be noted that where there might be confusion with respect to which type of reveal or conceal area is being referred to, the terms "camera conceal" and "camera reveal" can be used to indicate conceals and reveals based on camera movement, and "object conceal" and "object reveal" can be used to indicate conceals and reveals based on object movement.

In cases where the camera model's reconstructed vectors generally correlate closely to the actual vectors near the border, the camera model border handling works well. Where there is non-camera pan motion near the border (for example, a foreground object near the border) erroneously defining that area as a reveal or conceal area would cause errors on the interpolator output.

It should be noted that the camera model border handling can be turned off individually on each of the four picture edges if the number of vectors with bad vector/camera vector correlation is above a threshold in the region corresponding to that edge. The occlusion handling then reverts to some other occlusion handling used in non-border areas.

It should also be noted that it is possible to use the halo recuing interpolator according to the first embodiment of the invention as the interpolator on these reveal/conceal areas detected by the third embodiment of the present invention when it is determined that the area is not caused by a camera movement but rather by an object movement. In other words, the first and third embodiments of the present invention can be combined so that reveal and conceal areas due to object movement are handled by the first embodiment of the present invention, while reveal and conceal areas due to camera movement are handled by the third embodiment of the present invention.

Figure 18:
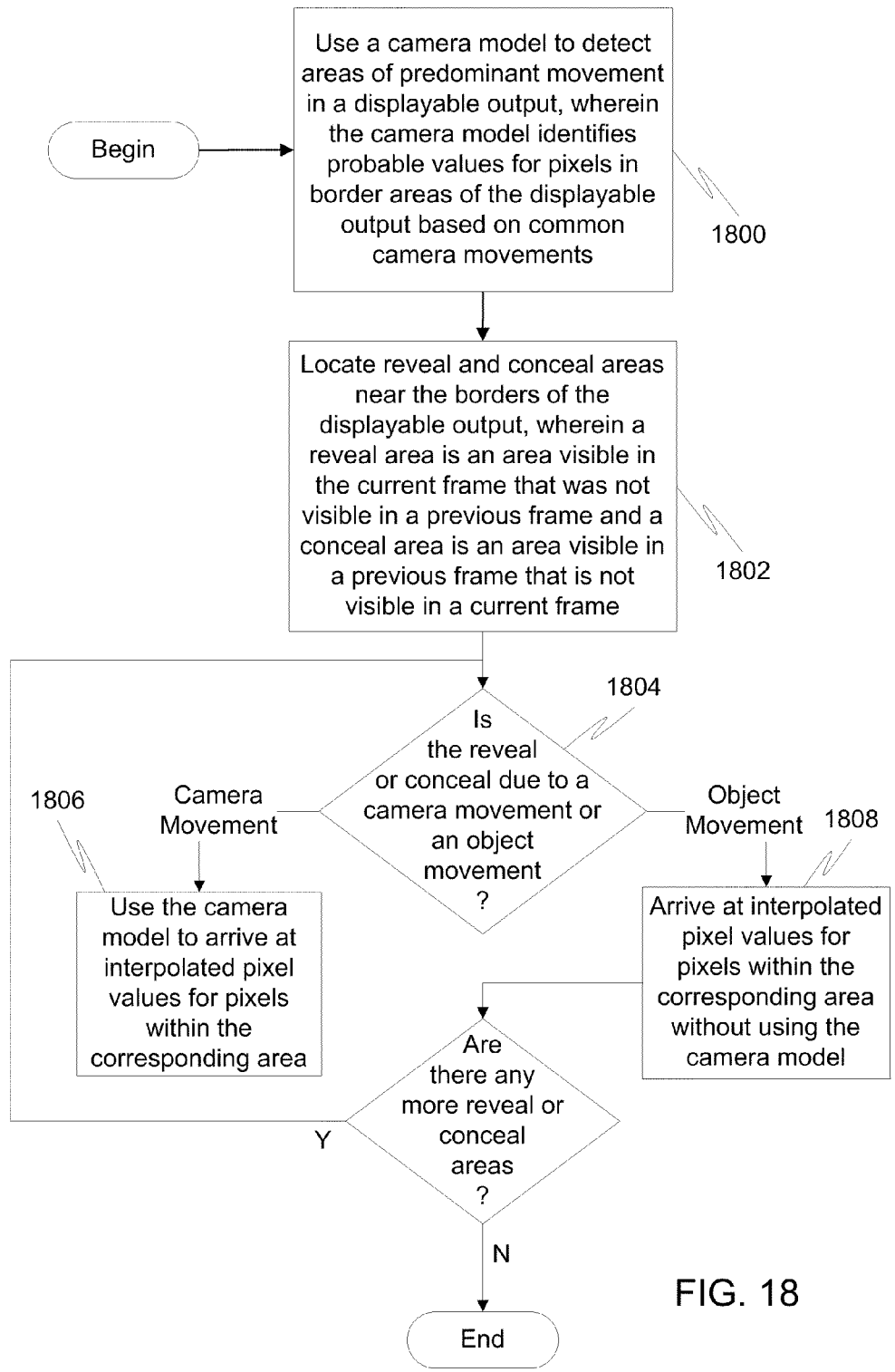
FIG. 18 is a flow diagram illustrating a method for providing border handling in motion compensated interpolation in accordance with the third embodiment of the present invention.

FIG. 18 is a flow diagram illustrating a method for providing border handling in motion compensated interpolation in accordance with the third embodiment of the present invention. At 1800, a camera model is used to detect areas of predominant movement in a displayable output, wherein the camera model identifies probable values for pixels in border areas of the displayable output based on common camera movements. These common camera movements may include, for example, pans, rotations, and zooms. At 1802, reveal and conceal areas near the borders of the displayable output are located, wherein a reveal area is an area visible in the current frame that was not visible in a previous frame and a conceal area is an area visible in a previous frame that is not visible in a current frame. Then 1804-1808 are performed for each reveal or conceal area. At 1804, it is determined whether the reveal or conceal area is due to a camera movement or an object movement. If it is due to a camera movement, then at 1806 the camera model is used to arrive at interpolated pixel values for pixels within the corresponding area. If the reveal or conceal area is not due to a camera movement, then at 1808 the system arrives at interpolated pixel values for pixels within the corresponding area without using the camera model. This may involve, for example, using a halo reducing interpolation process. The borders described above are the top and bottom edges of the displayable output for letterbox output, and the left and right edges of the displayable output for pillarbox output.

Figure 19:
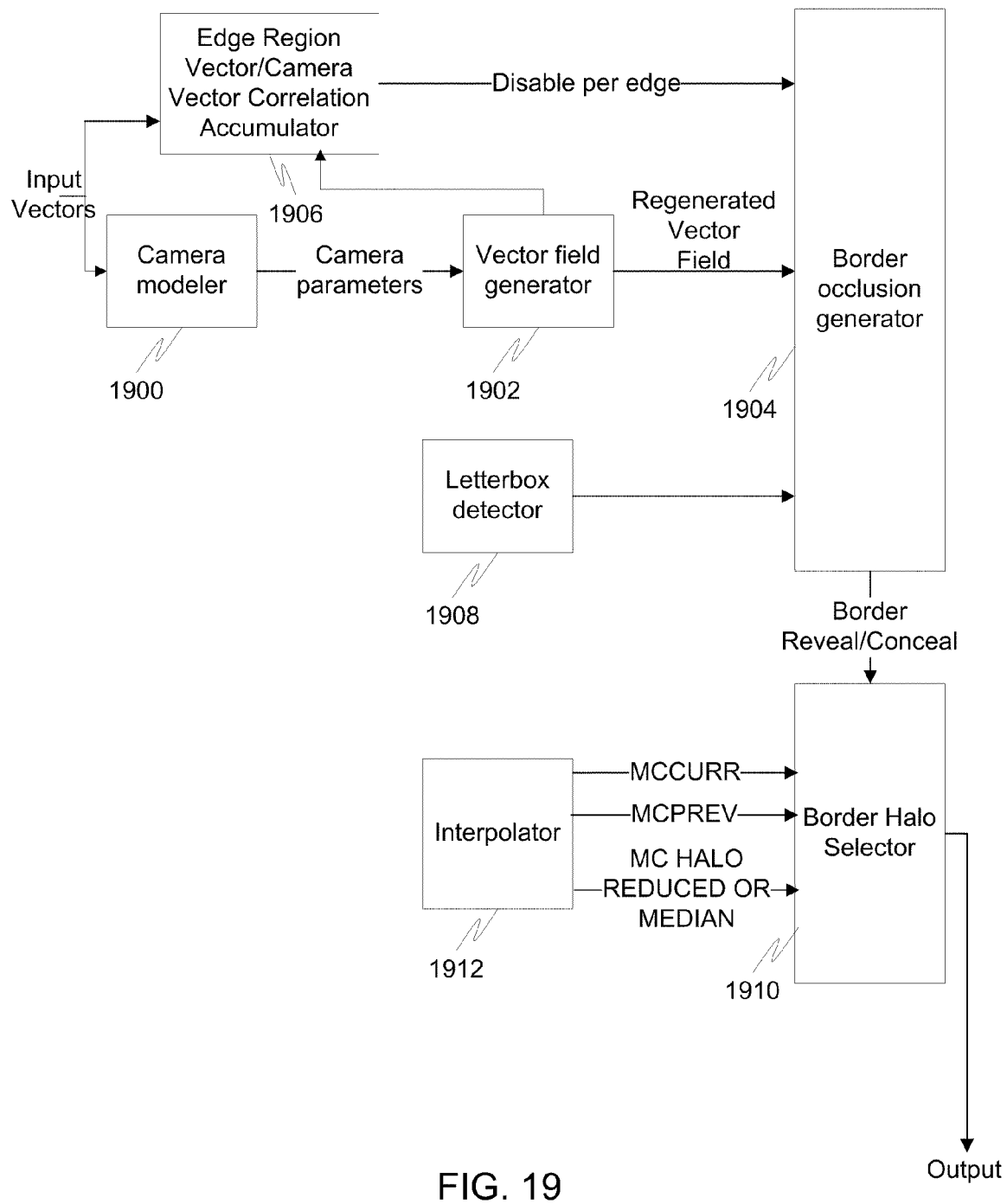
FIG. 19 is a block diagram illustrating a border handling motion compensation interpolator in accordance with the third embodiment of the present invention.

FIG. 19 is a block diagram illustrating a border handling motion compensation interpolator in accordance with the third embodiment of the present invention. A camera modeler 1900 may be configured to model movements in a displayable output and identify probable reveal and conceal areas for the displayable output. Camera parameters may then be output to a vector field generator 1902, which regenerates a vector field associated with the interpolated frame based upon the camera model. A vector field is a construct of the projections of forward and/or backward motion vectors. This regenerated vector field is passed to a border occlusion generator 1904, and also to an edge region vector/camera vector correlation accumulator 1906, which attempts to calculate camera correlation heuristics based on the edges of the displayable output.

A letterbox detector 1908 detects whether the displayable output is a letterbox, pillarbox, or neither, as well as the location of the borders.

The border occlusion generator 1904 then generates the border reveal/conceal signal according to the size of the border calculated from the regenerated vector field positioned according to the letterbox/pillarbox, and disables the signal on an edge by edge basis if the camera correlation heuristics per edge are over a threshold.

A border halo selector 1910 then directs the camera model motion compensated current and/or previous pixels onto the output in place of halo reducing interpolator motion compensated pixels (or pixels generated from an ordinary interpolator) when the border reveal/conceal signal is active. It should be noted that the border reveal/conceal signal could be more of a fade control as opposed to a simple switch, allowing the border halo selector to weight results of a camera model interpolator with those of a halo reducing interpolator (or ordinary interpolator) 1912.

Another issue that arises is how to detect whether occlusion is occurring in a particular region, especially for the object-type occlusion necessary to detect for the first embodiment of the present invention. As described earlier, the first embodiment of the present invention uses what is termed "full frame" occlusion detection, where essentially the PREV and CURR frames are utilized to determine whether an area is an occlusion area, disregarding any potential interpolated frames. This, however, does not account for the fact that the time slot of the interpolated frame can possibly alter whether or not the pixel is in a reveal or conceal region.

Figure 20:
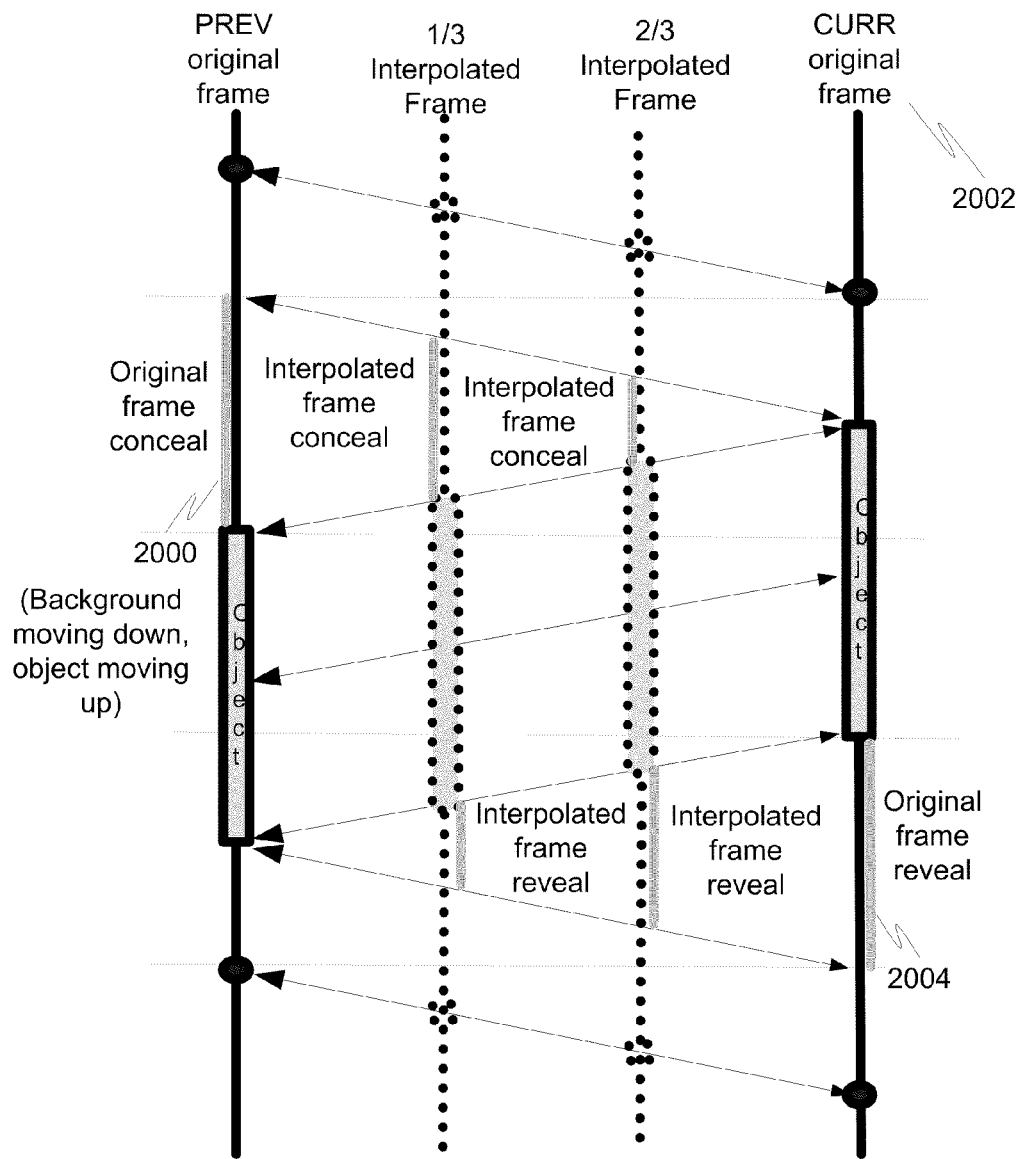
FIG. 20 illustrates an example where a background is moving down and an object moving up, while there are two frames to be interpolated between the PREV frame and the CURR frame.

For example, FIG. 20 illustrates an example where a background is moving down and an object moving up, while there are two frames to be interpolated between the PREV frame and the CURR frame. Here, the conceal region 2000 gets progressively smaller as the time slot gets later and later (i.e., closer to the CURR frame 2002). The reveal region 2004 gets progressively larger as the time slot gets later and later.

In a fourth embodiment of the present invention, intermediate frame (IF) occlusion detection is described. Here, for each interpolated frame, an intermediate frame occlusion is calculated by projecting the vectors onto the interpolated frame time slot. The results are filtered, processed, checked, and modified by the original frame occlusion to give a final intermediate frame occlusion output.

Input motion vectors are projected to the interpolated frame locations. This is performed separately for the forward vector and the backward vector fields. It is also repeated for each interpolated frame location. For example, if the requirement is to increase the frame rate by five times, there will be four interpolated frames at the ⅕, ⅖, ⅗, and ⅘ positions. Thus, the forward and backwards projections must be repeated four times, once for each of the four interpolated frame.

In one embodiment of the present invention, storage for the data regarding the projections comprises a single bit projected frame store for each pixel location for the forward vectors, and a single bit projected frame store for the each pixel location backward vectors for each interpolated frame. To start with, the projected frames are cleared (i.e., each address is set to zero).

For example, a forward motion vector MV=[mx, my] may be located at (x, y) in the PREV original frame, and it may point to the new location (x+mx, y+my) in the CURR original frame. A backward motion vector MV=[mx, my] located at (x, y) in the CURR original frame may point to the new location (x+mx, y+my) in the PREV original frame. The frame interpolation then requires 2 new frames, I1 and I2, to be inserted at the locations ⅓ and ⅔ of the inter-frame interval.

For the I1 forward frame at the ⅓ location, the input forward motion vector is scaled by the scaling factor ⅓. That is, ($\Delta$x, $\Delta$y)=⅓·(mx, my). The bit in the projected location (x+$\Delta$x, y+$\Delta$y) in the forward single bit projected frame store is set to indicate that a vector has been projected onto this location.

For the I1 backward frame at the ⅓ location, the input backward motion vector is scaled by the scaling factor ⅔. That is, ($\Delta$x, $\Delta$y)=⅔·(mx, my). The bit in the projected location (x+$\Delta$x, y+$\Delta$y) in the backward single bit projected frame store is set to indicate that a vector has been projected onto this location.

After the entire frame of vectors has been projected, any bits that are still zero in the projected frame stores are considered to be holes. These holes represent either where a forward vector projects to the location but no backwards vector projects to the location, or vice-versa.

A histogram filter is used to smooth off the holes in the single bit projected frame stores. The key is to determine whether a hole is merely an erroneous or spurious value, or whether it does indeed indicate an occlusion area. Therefore, for each location, the hole count within a localized area (which may be called a kernel) is calculated, and if the result is above a threshold, then the output will be a hole. A higher weighting can be given to holes near the center of the kernel.

The filter threshold is adjustable. Smaller values tend to enlarge the hole and hence also enlarge the intermediate frame occlusion areas.

Generally, an area is considered to be a conceal region where there is a hole in the backward projected frame store, and a reveal region where there is a hole in the forward projected frame store.

Figure 21:
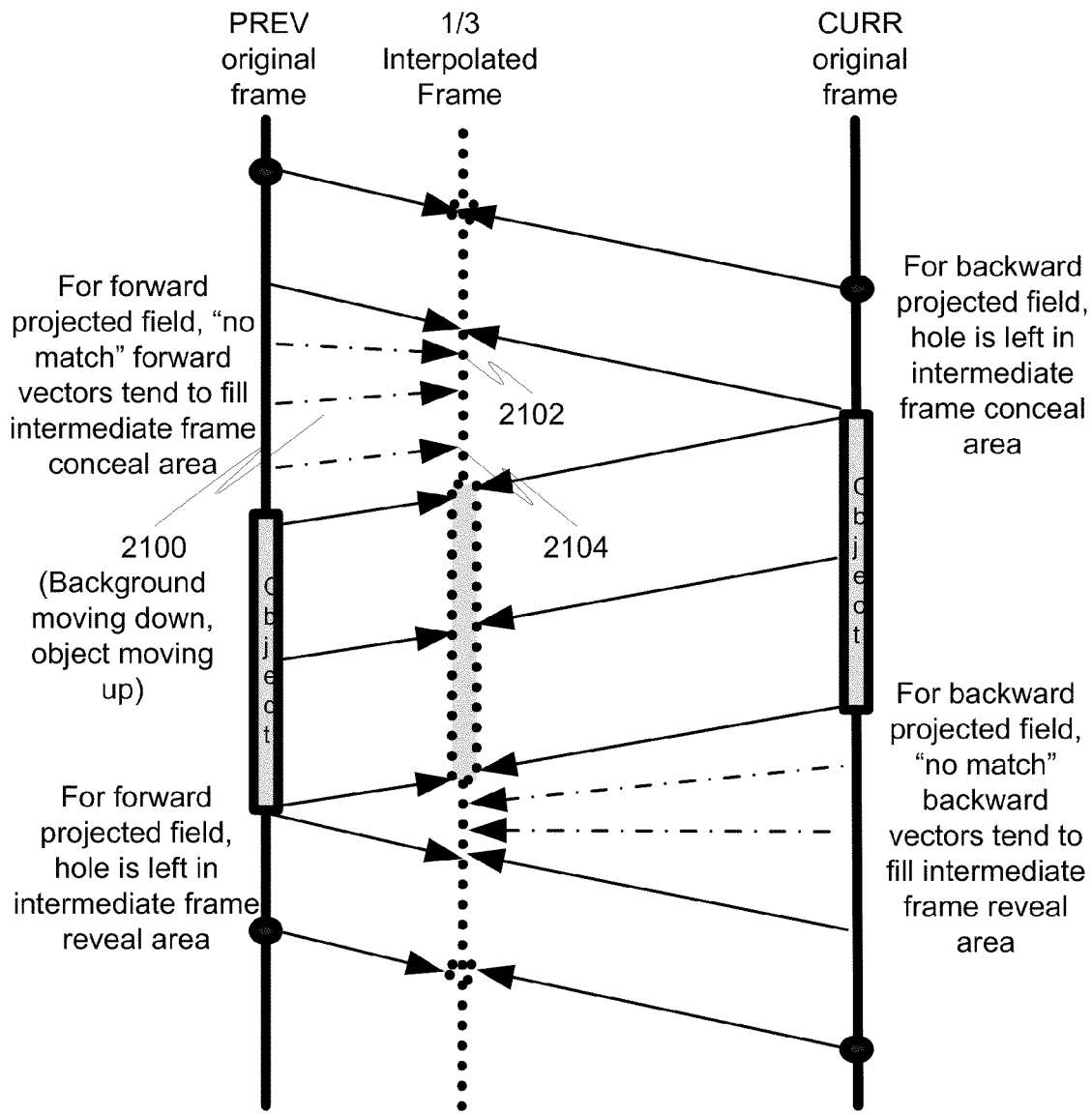
FIG. 21 is an example of suspect reveal and conceal areas.

Of course, motion vectors in reveal or conceal areas can be suspect even when an apparent match is found. FIG. 21 is a diagram an example of this. As can be seen in FIG. 21, forward vector projections 2100 found matches, but the matches are such that the projections are going in different directions than the background appears to be moving (and different from other projections in the same area). This oftentimes will not present a problem, however, as long as a match is found, the projection will typically be good enough to fill in an intermediate frame occlusion area.

There is, however, ambiguity where there is a hole in both the forward and backward projected frame. This occurs because the "no match" forward vectors do not always fill in the entire conceal region, and the "no match" backward vectors do not always fill in the entire reveal region. As can be seen in FIG. 21, the forward vectors leave holes 2102, 2104 in the interpolated frame conceal area. The question then becomes what to do with these areas that have neither a projected forward vector nor a projected backward vector. Does one treat them as a reveal area or a conceal area?

In an embodiment of the present invention, the ambiguity is resolved by only allowing an interpolated frame conceal region where there is not an original frame reveal region, and only allowing an interpolated frame reveal region where there is not an original frame conceal region.

The original frame reveal and conceal regions are calculated by checking the correlation of pixels from the motion compensated CURR frame with the PREV frame using forward vectors, and by checking the correlation of pixels from the motion compensated PREV frame with the CURR frame using backward vectors.

Where the correlation of the motion compensated pixels from the CURR frame to the PREV frame is relatively poor, this indicates there is a conceal region. Where the correlation of the motion compensated pixels from the PREV frame to the CURR frame is relatively poor, this indicates there is a reveal region.

In this manner, full frame occlusion detection is effectively used as a backup to intermediate frame occlusion detection in areas where intermediate frame occlusion detection is unreliable.

Figure 22:
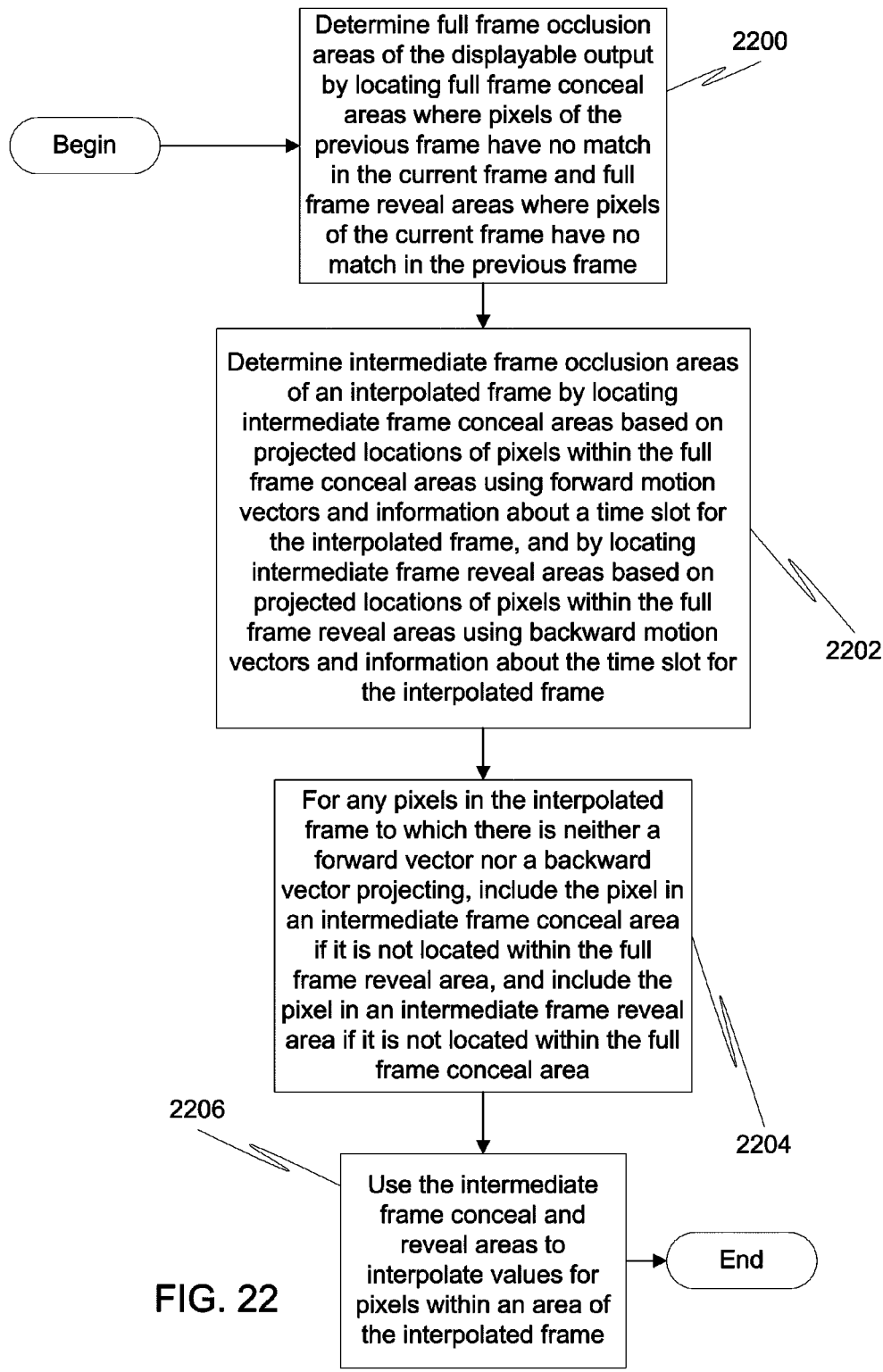
FIG. 22 is a flow diagram illustrating a method for performing motion compensated interpolation using a previous frame and a current frame of a displayable output in accordance with the fourth embodiment of the present invention.

FIG. 22 is a flow diagram illustrating a method for performing motion compensated interpolation using a previous frame and a current frame of a displayable output in accordance with the fourth embodiment of the present invention. At 2200, full frame occlusion areas of the displayable output are determined by locating full frame conceal areas where pixels of the previous frame have no match in the current frame and full frame reveal areas where pixels of the current frame have no match in the previous frame.

At 2202, intermediate frame occlusion areas of an interpolated frame are determined by locating intermediate frame conceal areas based on projected locations of pixels within the full frame conceal areas using forward motion vectors and information about a time slot for the interpolated frame, and by locating intermediate frame reveal areas based on projected locations of pixels within the full frame reveal areas using backward motion vectors and information about the time slot for the interpolated frame. This may include weighting backward and forward motion vectors based upon the proximity of the time slot of the interpolated frame to the current and previous frames, respectively. The time slot indicates the temporal distance between the interpolated frame and the previous frame and between the interpolated frame and the current frame.

Calculations used to aid in the determination of step 2202 can be performed using forward and backward frame stores, wherein the forward and backward frame stores each contain a single bit storage for each pixel of an interpolated frame. These frame stores may be initialized so each of the single bit storages are zero. Then corresponding pixels in the forward frame store are set to non-zero based on the projected locations of pixels using forward motion vectors and the previous frame and the information about a time slot for the interpolated frame. The corresponding pixels in the backward frame store are set to non-zero based on the projected locations of pixels using backward motion vectors and the information about a time slot for the interpolated frame. The determination of intermediate frame occlusion areas of an interpolated frame can then include identifying a pixel as part of an intermediate frame conceal area if the single bit storage corresponding to the pixel in the backward frame stores is zero while the single bit storage corresponding to the pixel in the forward frame stores is non-zero, and identifying a pixel as part of an intermediate frame reveal area of the single bit storage corresponding to the pixel in the forward frame stores is zero while the single bit storage corresponding to the pixel in the backward frame stores is non-zero. A pixel in the interpolated frame to which there is neither a forward vector nor a backward vector projecting is identified based upon whether both the single bit storage corresponding to the pixel in the forward frame store and the single bit storage corresponding to the pixel in the backward frame store are zero.

A histogram filter can also be used to aid in determining whether a region of pixels in the intermediate frame is an occlusion area. The histogram filter may have an adjustable threshold; wherein the higher the threshold is set, the less likely that a region of pixels will be determined to be an occlusion area.

At 2204, for any pixels in the interpolated frame to which there is neither a forward vector nor a backward vector projecting, the pixel is included in an intermediate frame conceal area if it is not located within the full frame reveal area, and the pixel is included in an intermediate frame reveal area if it is not located within the full frame conceal area. At 2206, the intermediate frame conceal and reveal areas are used to interpolate values for pixels within an area of the interpolated frame. Optionally, this could include, when the area is neither an intermediate frame reveal area nor an intermediate frame conceal area, using both forward vectors applied to the current frame and backward vectors applied to the previous frame to calculate values for pixels within the area, when the area is an intermediate frame reveal area, using forward vectors applied to the current frame to calculate values for pixels within the area, without using backward vectors, and when the area is an intermediate frame conceal area, using backward vectors applied to the previous frame to calculate values for pixels within the area, without using forward vectors.

Figure 23:
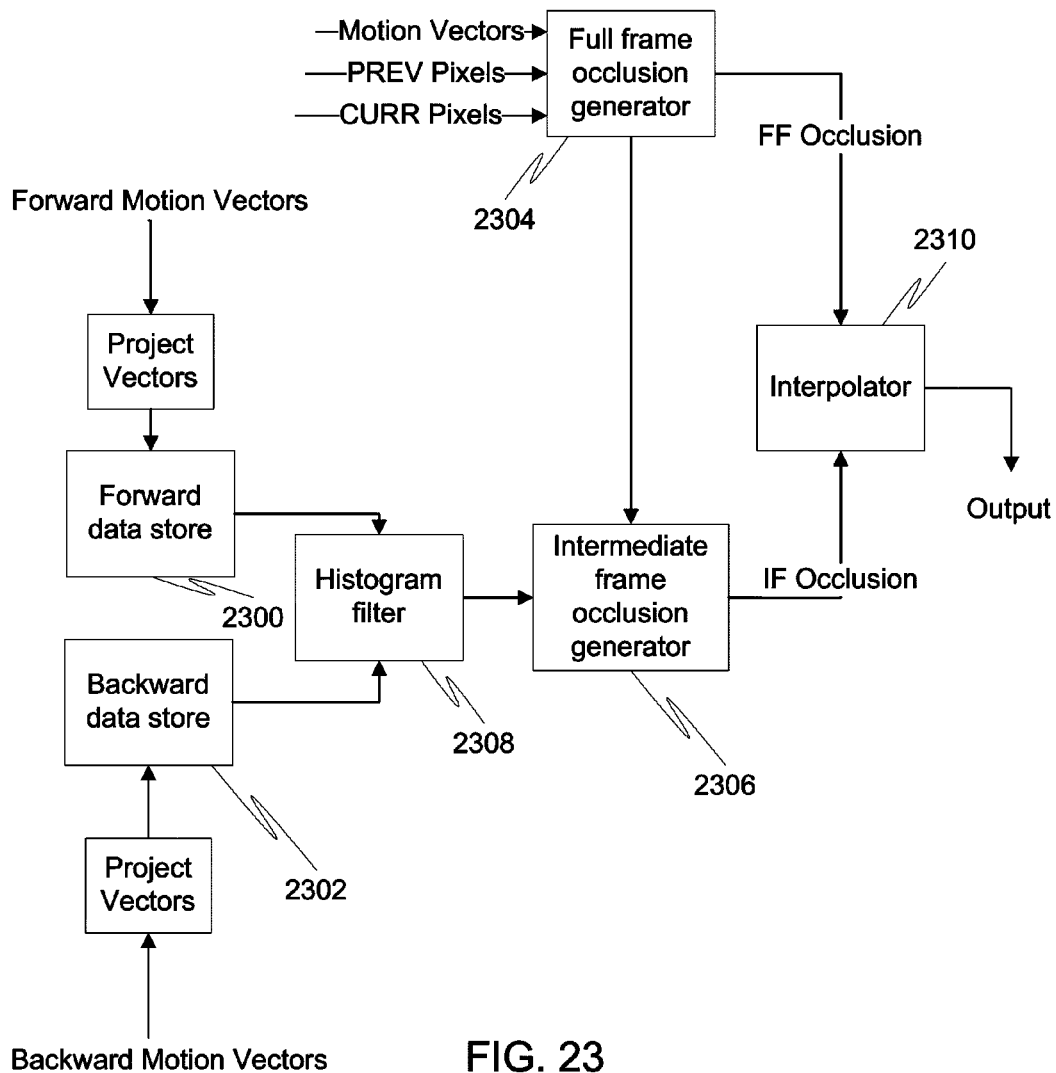
FIG. 23 is a block diagram of an intermediate frame occlusion estimation system in accordance with the fourth embodiment of the present invention.

FIG. 23 is a block diagram of an intermediate frame occlusion estimation system in accordance with the fourth embodiment of the present invention. A forward data store 2300 contains an entry for each pixel in an intermediate frame to be interpolated from a current and previous frame of displayable output. A backward data store 2302 also contains an entry for each pixel in the intermediate frame. These entries can be single bit entries. A full frame occlusion generator 2304 can be configured to determine full frame occlusion areas of the displayable output by locating full frame conceal areas where pixels of the previous frame have no match in the current frame and full frame reveal areas where pixels of the current frame have no match in the previous frame. This full frame occlusion generator may be, for example, a halo reducing interpolator. An intermediate frame occlusion generator 2306 can be configured to determine intermediate frame occlusion areas of the interpolated frame by locating intermediate frame conceal areas based on projected locations of pixels within the full frame conceal areas using motion vectors and information about a time slot for the interpolated frame, and by locating intermediate frame reveal areas based on projected locations of pixels within the full frame reveal areas using backward motion vectors and information about the time slot for the interpolated frame. The intermediate frame occlusion generator 2306 can further be configured to, for any pixels in the interpolated frame to which there is neither a forward vector nor a backward vector projecting: include the pixel in an intermediate frame conceal area if it is not located within the full frame reveal area; and include the pixel in an intermediate frame reveal area if it is not located within the full frame conceal area.

A histogram filter 2308 can be coupled to the intermediate frame occlusion generator 2306, the forward data store 2300, and the backward data store 2302.

An interpolator 2310 may then be coupled to the intermediate frame occlusion generator to interpolate the intermediate frame based upon the intermediate frame reveal and conceal areas.

A fifth embodiment of the present invention uses intermediate frame occlusion to pull pixels from the appropriate input frame, and full frame occlusion to select only forward vectors where there is no match for backward vectors or backward vectors where there is no match for forward vectors.

Forward vectors are calculated by taking a fixed block of pixels in the PREV frame and searching the CURR frame for a match. Where a portion of the background has been concealed by a foreground object, a correct match will not be possible.

Backward vectors are calculated by taking a fixed block of pixels in the CURR frame and searching the PREV frame for a match. Where a portion of the background has been revealed by a foreground object, a correct match will not be possible.

Two different methods of detecting the occlusion (reveal and conceal) areas are used. These are the full frame occlusion (FF Reveal and Conceal) and the Intermediate frame occlusion (IF Reveal and Conceal), both described earlier.

The full frame occlusion is generated using the picture correlation vector confidence block followed by an assignment status histogram filter. The FF occlusion field is common to all the interpolated frames.

The intermediate frame occlusion is generated by finding where there are holes in the projected forward and backward primary vector fields. There is a separate IF occlusion field for each of the interpolated frames.

The full frame occlusion (FF Reveal and Conceal) is generated by the picture correlation vector confidence block. This is done by checking how well the full frame motion compensated Y/C pixels match for both forward and backward vectors. For example, if the forward pixels correlate much better than the backward pixels, this indicates there was no backward match possible, and it is a reveal region.

The assignment status histogram filter smoothes out speckle noise in the FF reveal and conceal regions.

The Intermediate frame occlusion (IF Reveal and Conceal) is determined after projecting the primary vectors onto the intermediate frame.

The projected vector histogram filter is used to smooth off the holes (that indicate IF occlusion) in the projected primary vector fields. Small holes in the projected vector field are filled in. The filter threshold is variable to allow some stretching or reduction of the IF occlusion area.

The projected vector fields are used to determine the IF reveal and conceal regions. Where there is a hole in the projected backward primary vector field, this indicates an IF conceal region. Where there is a hole in the projected forward primary vector field, this indicates an IF reveal region.

The FF reveal and conceal areas are used to resolve ambiguities caused by holes in both projected primary fields as follows. IF reveal is allowed except in FF conceal and IF conceal is allowed except in FF reveal.

The fifth embodiment of the present invention then can also be specifically designed to utilize secondary motion vectors to enhance halo artifact reduction. Specifically, motion vectors calculated from the PREV and CURR frames can be termed "primary" motion vectors. The fifth embodiment of the present invention, however, also utilizes the frame prior to the PREV frame (PREV−2) and the frame subsequent to the CURR frame (CURR+1), which can be termed "secondary" motion vectors, to enhance its functionality.

The secondary vectors will only be projected if they have good weighted correlation (a confidence measure). This is to prevent erroneous secondary vectors from being used.

IF conceal will not be allowed if there is no projected backward secondary vector to be used due to a hole in the projected backward secondary field. IF reveal will not be allowed if there is no projected forward secondary vector to be used due to a hole in the projected forward secondary field.

Backward secondary projected vectors are inserted into the non projected backward vector field in the IF reveal regions. Similarly, forward secondary projected vectors are inserted into the non projected forward vector field in the IF conceal regions. The resulting fields are filtered by spatial vector filters with a close neighbor threshold.

In an alternative embodiment, the secondary vectors are inserted without projecting them first. The resulting fields are filtered by vector filters with a close neighbor threshold.

The close neighbor threshold for the filter is switched depending on if the center vector was in an IF region. This is because near the object/background boundary it may be desirable to reduce the possibility of smearing the object vectors into the background vectors.

In non-occluded regions, the scaled backward vectors are used on the previous frame pixel data to produce the motion compensated PREV pixel. Similarly the scaled forward vectors are used on the current frame pixel data to produce the motion compensated CURR Pixel.

In the full frame reveal area, the backward vectors are likely to be erroneous as they have no match, therefore the forward vectors can be used in their place on the previous frame pixel data (suitably inverted and scaled) to produce the motion compensated previous pixel.

Similarly in the full frame conceal area, the forward vectors are likely to be erroneous as they have no match, therefore the backward vectors can be used in their place on the current frame pixel data (suitably inverted and scaled) to produce the motion compensated current pixel.

The MC Current, MC Previous and Temporal Average Y/C pixels are taken to a 3 tap LC median filter and the output is the MC Median pixel. The MC Median pixel is used except in occlusion regions.

The system may have two modes. In the first mode, the FF occlusion will be used to select the MCPREV pixel in conceal areas or the MCCURR pixel in reveal areas. When the system is in the second mode, the IF occlusion will be used for the selection.

The OSWIM (Object Speed Weighted Interpolation Mode) adaptive blend control is also available for the first mode. It blends the halo-reduced and the straight median pixels depending on the speed of the foreground object, as described above with respect to the second embodiment of the present invention.

Additionally, border halo reduction is available in accordance with the third embodiment of present invention described above. This uses the camera model to determine if there is a reveal or conceal region at the edge of the letterbox. It is disabled on an edge by edge basis if there is ambiguity in the border region due to an object close to that edge. It can give an improved halo performance at boundaries provided the letterbox is accurately known.

With well behaved input material, where the Motion Estimator can produce a vector field that is fairly accurate, the more sophisticated Projected Vector Interpolator can produce results with better halo performance. However, when the vectors are inaccurate, the artifacts produced by the Projected Vector Interpolator are more objectionable than the simple 3 tap median non-projected interpolator.

Therefore, an embodiment of the present invention provides an ability to control the interpolator mode frame by frame based on vector histograms and other instrumentation.

It is also not desirable to risk extending the motion compensated frames outside the letterbox or pillarbox as this would look untidy. However there may be useful off-screen display (OSD) or other material in this region.

Therefore, either the temporal average of the PREV and CURR input pixel or alternatively a simple repeat of one of these pixels, will be inserted in the interpolated frame when outside the letterbox or pillarbox.

The mode control allows a full MC mode, a temporal filtered MC mode, and an MC bypass mode controllable by firmware on a frame by frame basis according to analysis of the picture content.

Figure 24:
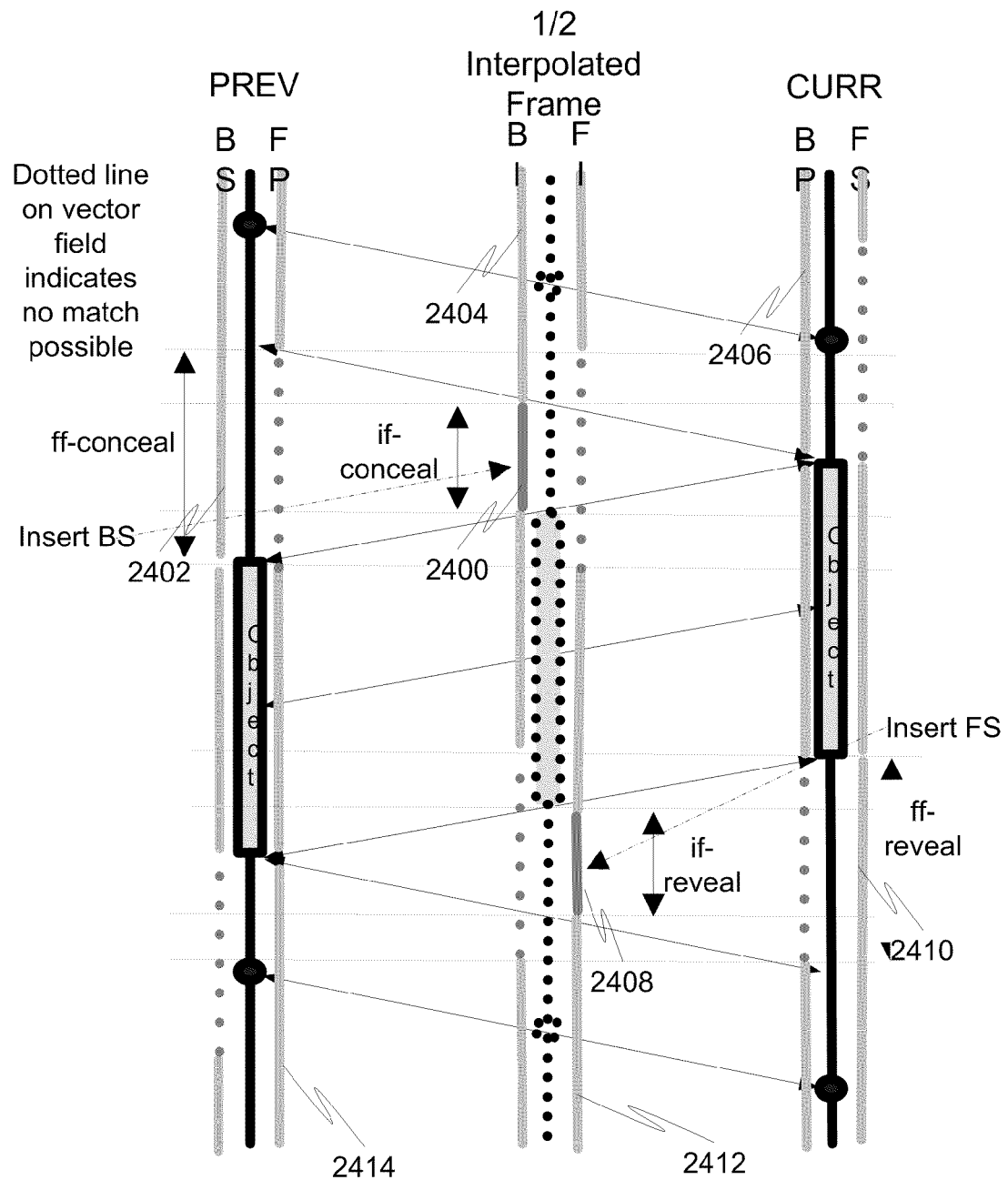
FIG. 24 is a diagram illustrating the generation of backward interpolated (BI) and forward interpolated (FI) vector fields in accordance with the fifth embodiment of the present invention.

FIG. 24 is a diagram illustrating the generation of backward interpolated (BI) and forward interpolated (FI) vector fields in accordance with the fifth embodiment of the present invention.

The BI vector field is simply the non-projected BP (backward primary) field with the projected BS (backward secondary) vectors inserted in the IF conceal region. An example of this is IF conceal region 2400, which is projected based on backward secondary vectors 2402, whereas the rest of the BI vector field 2404 is simply identical to the BP vector field 2406.

The FI vector field is simply the non-projected FP (forward primary) field with the projected FS (forward secondary) vectors inserted in the IF reveal region. An example of this is IF reveal region 2408, which is projected based on forward secondary vectors 2410, whereas the rest of the FI vector field 2412 is simply identical to the FP vector field 2414.

After the insertion of the secondary vectors, the BI and FI vector fields are spatially filtered to smooth over discontinuities and to generate fractional bits. They are then used for pixel interpolation.

Figure 25:
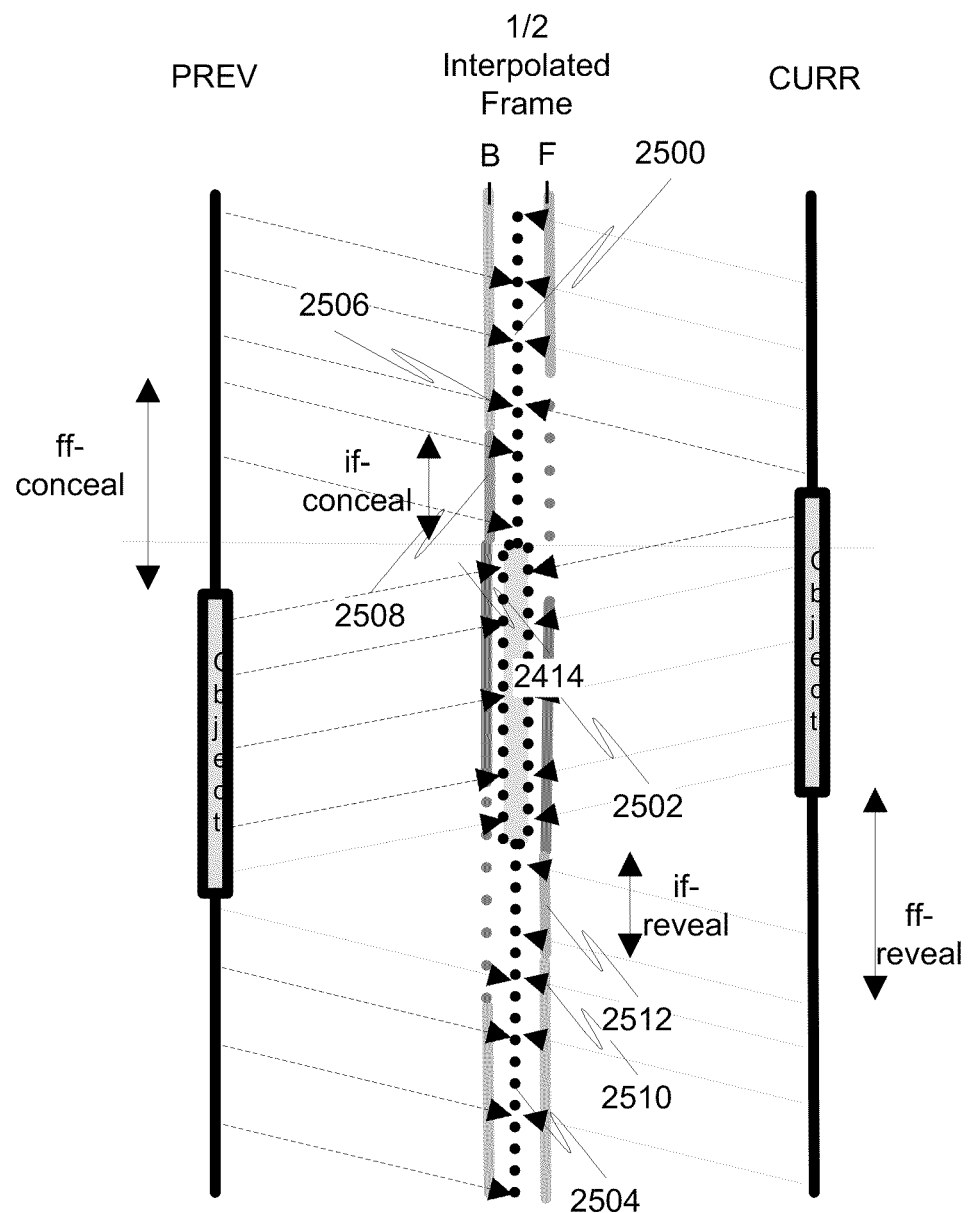
FIG. 25 is a diagram illustrating how the pixels are brought in to the interpolated field using the BI and FI vector fields.

FIG. 25 is a diagram illustrating how the pixels are brought in to the interpolated field using the BI and FI vector fields. In cases where motion compensated pixels are brought in from both frames, a 3 tap median with the temporal average pixel may be performed. This includes areas 2500, 2502, and 2504. In one embodiment, this also includes any other area, such as 2506, 2510, and 2514, except where there is an IF reveal or IF conceal, such as 2512 and 2508. In the non-occluded areas, pixels are brought in from the previous frame with backward vectors and from the current frame with the forward vectors.

Figure 26:
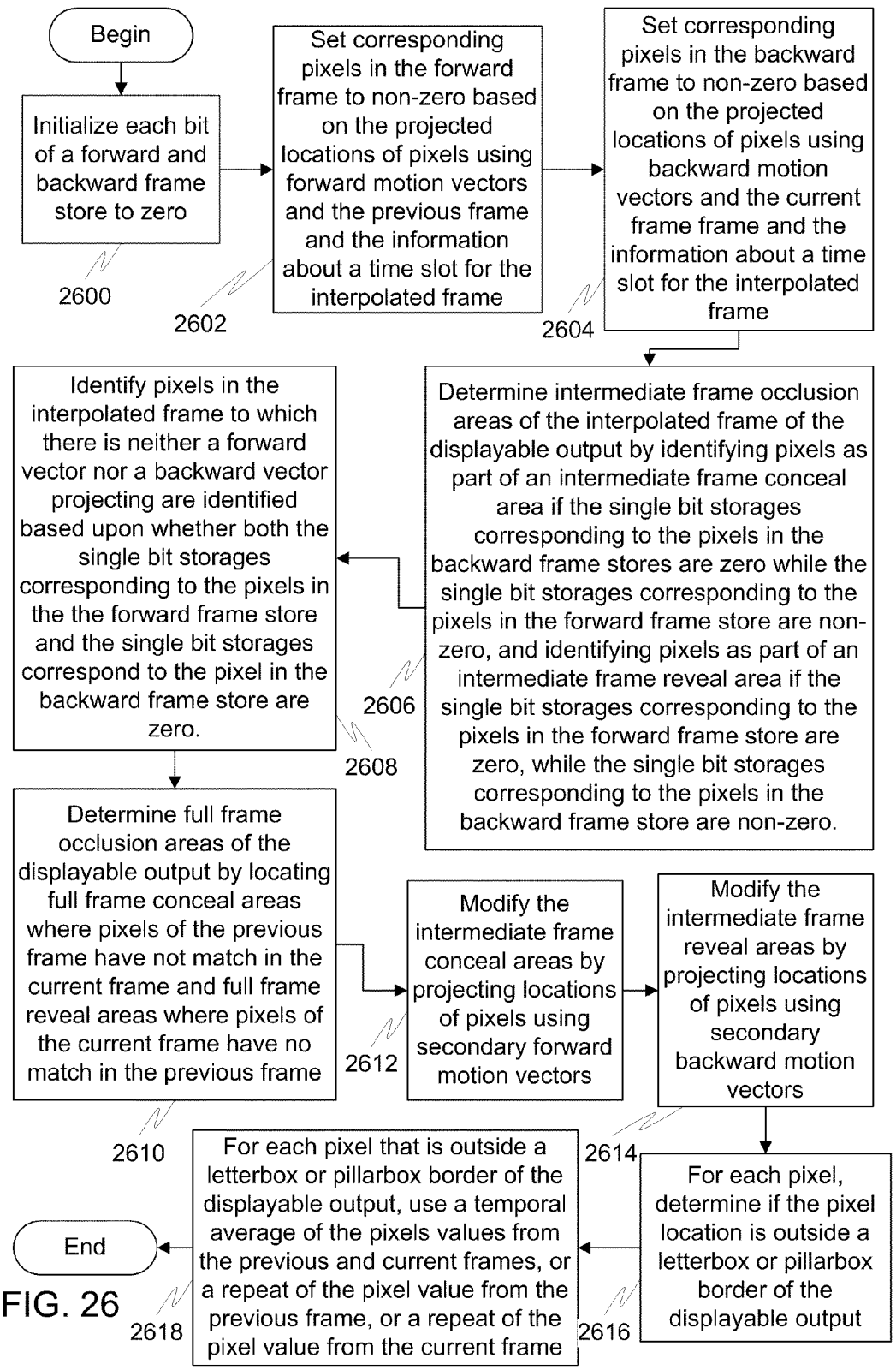
FIG. 26 is a flow diagram illustrating a method for performing motion compensated interpolation using a previous frame and a current frame of a displayable output in accordance with the fifth embodiment of the present invention.

FIG. 26 is a flow diagram illustrating a method for performing motion compensated interpolation using a previous frame and a current frame of a displayable output in accordance with the fifth embodiment of the present invention. While multiple steps are described, this essentially is a two-phase process. In the first phase, BI and FI vector fields are generated. In the second phase, these vector fields are utilized in order to project the proper pixels into the intermediate frame. At 2600, each bit of a forward and backward frame store are initialized to zero. At 2602, corresponding pixels in the forward frame store are set to non-zero based on the projected locations of pixels using forward motion vectors and the previous frame and the information about a time slot for the interpolated frame. At 2604, corresponding pixels in the backward frame store are set to non-zero based on the projected locations of pixels using backward motion vectors and the current frame and the information about a time slot for the interpolated frame. These two steps may include weighting backward and forward motion vectors based upon the proximity of the time slot of the interpolated frame to the current and previous frames, respectively. The time slot indicates the temporal distance between the interpolated frame and the previous frame and between the interpolated frame and the current frame.

At 2606, intermediate frame occlusion areas of the interpolated frame of the displayable output are determined by identifying pixels as part of an intermediate frame conceal area if the single bit storages corresponding to the pixels in the backward frame store are zero while the single bit storage corresponding to the pixels in the forward frame store are non-zero, and identifying pixels as part of an intermediate frame reveal area FF the single bit storages corresponding to the pixels in the forward frame store are zero while the single bit storages corresponding to the pixels in the backward frame stores are non-zero.

At 2608, pixels in the interpolated frame to which there is neither a forward vector nor a backward vector projecting are identified based upon whether both the single bit storages corresponding to the pixels in the forward frame store and the single bit storages corresponding to the pixels in the backward frame store are zero.

Optionally, the determination of intermediate frame occlusion areas of an interpolated frame can use a histogram filter to aid in determining whether a region of pixels in the intermediate frame is an occlusion area. The histogram filter may have an adjustable threshold; wherein the higher the threshold is set, the less likely that a region of pixels will be determined to be an occlusion area.

At 2610, full frame occlusion areas of the displayable output are determined by locating full frame conceal areas where pixels of the previous frame have no match in the current frame and full frame reveal areas where pixels of the current frame have no match in the previous frame.

At 2612, the intermediate frame conceal areas are modified by projecting locations of pixels using secondary forward motion vectors. At 2614, the intermediate frame reveal areas are modified by projecting locations of pixels using secondary backward motion vectors.

At 2616, for each pixel, it may be determined if a pixel location is outside a letterbox or pillarbox border of the displayable output. If so, then at 2618, a temporal average of the pixel values from the previous and current frames may be used, or a repeat of the pixel value from the previous frame, or a repeat of the pixel value from the current frame.

Figure 27:
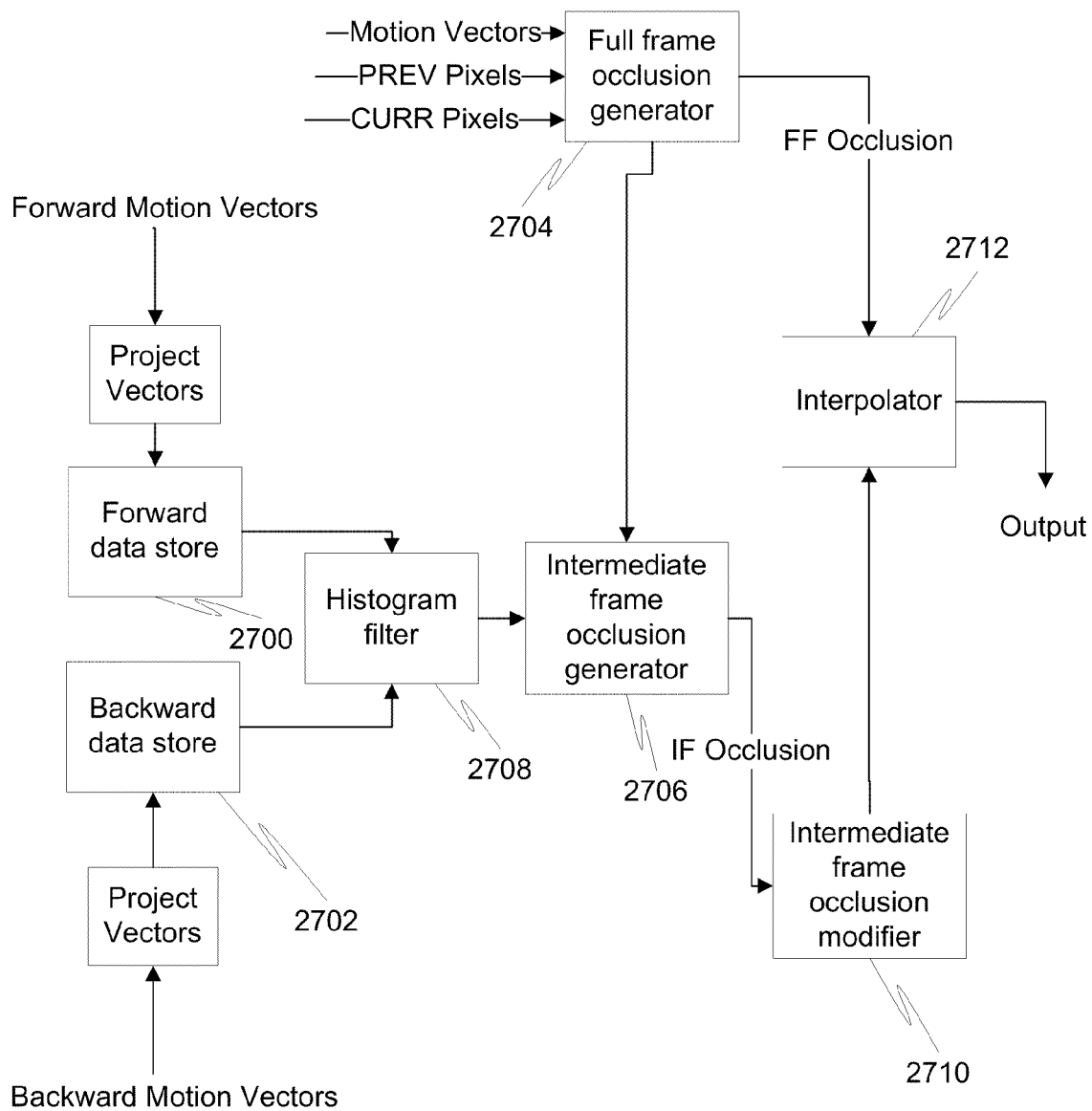
FIG. 27 is block diagram illustrating an interpolator in accordance with the fifth embodiment of the present invention.

FIG. 27 is block diagram illustrating an interpolator in accordance with the fifth embodiment of the present invention. A forward data store 2700 contains an entry for each pixel in an intermediate frame to be interpolated from a current and previous frame of displayable output. A backward data store 2702 also contains an entry for each pixel in the intermediate frame. These entries can be single bit entries. A full frame occlusion generator 2704 can be configured to determine full frame occlusion areas of the displayable output by locating full frame conceal areas where pixels of the previous frame have no match in the current frame and full frame reveal areas where pixels of the current frame have no match in the previous frame. This full frame occlusion generator may be, for example, a part of a halo reducing interpolator. An intermediate frame occlusion generator 2706 can be configured to determine intermediate frame occlusion areas of an interpolated frame of the displayable output by locating intermediate frame conceal areas based on projected locations of pixels within the full frame conceal areas using primary forward motion vectors and information about a time slot for the interpolated frame, and by locating intermediate frame reveal areas based on the projected locations of pixels within the full frame reveal areas using primary backward motion vectors and information about the time slot for the interpolated frame.

A histogram filter 2708 can be coupled to the intermediate frame occlusion generator 2706, the forward data store 2700, and the backward data store 2702.

An intermediate frame occlusion modifier 2710 is then configured to modify the intermediate frame conceal areas by projecting locations of pixels using secondary forward motion vectors, and to modify the intermediate frame reveal areas by projecting locations of pixels using secondary backward motion vectors.

An interpolator 2712 may interpolate the intermediate frame based upon the intermediate frame reveal and conceal areas.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention. It should also be noted that the various embodiments described within this document can be mixed and matched with each other in various combinations. For space purposes, not every combination and permutation of these embodiments is explicitly described in this document. However, one of ordinary skill in the art will recognize that the scope of the invention shall be construed to cover such combinations and permutations.

I claim:

1. A method for performing motion compensated interpolation using a previous frame and a current frame of a displayable output, the method comprising:
   determining full frame occlusion areas of the displayable output by locating full frame conceal areas where pixels of the previous frame have no match in the current frame and full frame reveal areas where pixels of the current frame have no match in the previous frame;
   determining intermediate frame occlusion areas of an interpolated frame of the displayable output by locating intermediate frame conceal areas based on projected locations of pixels within the full frame conceal areas using primary forward motion vectors and information about a time slot for the interpolated frame, and by locating intermediate frame reveal areas based on projected locations of pixels within the full frame reveal areas using primary backward motion vectors and information about the time slot for the interpolated frame;
   modifying the intermediate frame conceal areas by projecting locations of pixels using secondary forward motion vectors, wherein the secondary forward motion vectors are associated with a frame subsequent to the current frame; and modifying the intermediate frame reveal areas by projecting locations of pixels using secondary backward motion vectors, wherein the secondary backward motion vectors are associated with a frame prior to the previous frame.

2. The method of claim 1, further comprising:
for any pixels in the interpolated frame to which there is neither a forward vector nor a backward vector projecting:
including the pixel in an intermediate frame conceal area if it is not located within the frame reveal area;
including the pixel in an intermediate frame reveal area if it is not located within the full frame conceal area; and
using the intermediate frame conceal and reveal areas to interpolate values for pixels within an area of the interpolated frame.

3. The method of claim 1, further comprising:
determining if a pixel location is outside a letterbox or pillarbox border of the displayable output; and
if the pixel location is outside the letterbox or pillarbox border of the displayable output, inserting the temporal average of the pixel values from the previous and current frames.

4. The method of claim 1, further comprising:
determining if a pixel location is outside a letterbox or pillarbox border of the displayable output; and
if the pixel location is outside the letterbox or pillarbox border of the displayable output, inserting a repeat of the pixel value from the previous frame.

5. The method of claim 1, further comprising:
determining if a pixel location is outside a letterbox or pillarbox border of the displayable output; and
if the pixel location is outside the letterbox or pillarbox border of the displayable output, inserting a repeat of the pixel value from the current frame.

6. The method of claim 1, further comprising setting a system to a full motion compensated mode, a temporal filtered motion compensated mode, or a motion compensated bypass mode on a frame by frame basis according to analysis of the picture content.

7. The method of claim 2, wherein the using the intermediate frame conceal and reveal areas to interpolate values for pixels within an area of the interpolated frame includes:
when the area is neither an intermediate frame reveal area nor an intermediate frame conceal area, using both forward vectors applied to the current frame and backward vectors applied to the previous frame to calculate values for pixels within the area;
when the area is an intermediate frame reveal area, using forward vectors applied to the current frame to calculate values for pixels within the area, without using backward vectors; and
when the area is an intermediate frame conceal area, using backward vectors applied to the previous frame to calculate values for pixels within the area, without using forward vectors.

8. The method of claim 1, wherein the determining intermediate frame occlusion areas includes weighting backward and forward motion vectors based upon the proximity of the time slot of the interpolated frame to the current and previous frames, respectively.

9. The method of claim 1, wherein the time slot indicates the temporal distance between the interpolated frame and the previous frame and between the interpolated frame and the current frame.

10. The method of claim 1, further comprising initializing a forward frame store and a backward frame store for the interpolated frame, wherein the forward and backward frame store each contain a single bit storage for each pixel of the interpolated frame, and wherein the initialization includes setting each of the single bit storages to zero.

11. The method of claim 10, further comprising:
setting corresponding pixels in the forward frame store to non-zero based on the projected locations of pixels using forward motion vectors and the previous frame and the information about a time slot for the interpolated frame; and
setting corresponding pixels in the backward frame store non-zero based on the projected locations of pixels using backward motion vectors and the information about a time slot for the interpolated frame.

12. The method of claim 10, wherein the determining intermediate frame occlusion areas of an interpolated frame includes identifying a pixel as part of an intermediate frame conceal region if the single bit storage corresponding to the pixel in the backward frame store is zero while the single bit storage corresponding to the pixel in the forward frame store is non-zero.

13. The method of claim 10, wherein the determining intermediate frame occlusion areas of an interpolated frame includes identifying a pixel as part of an intermediate frame reveal region if the single bit storage corresponding to the pixel in the forward frame store is zero while the single bit storage corresponding to the pixel in the backward frame store is non-zero.

14. The method of claim 10, wherein a pixel in the interpolated frame to which there is neither a forward vector nor a backward vector is identified based upon whether both the single bit storage corresponding to the pixel in the forward frame store and the single bit storage corresponding to the pixel in the backward frame store are zero.

15. The method of claim 1, further comprising using a histogram filter to aid in determining whether a region of pixels in the intermediate frame is an occlusion area.

16. The method of claim 15, wherein the histogram filter has an adjustable threshold, wherein the higher the threshold is set, the less likely that a region of pixels will be determined to be an occlusion area.

17. An interpolator comprising:
a forward data store containing an entry for each pixel in an intermediate frame to be interpolated from a current and previous frame of displayable output;
a backward data store containing an entry for each pixel in the intermediate frame;
a full frame occlusion generator configured to determine full frame occlusion areas of the displayable output by locating full frame conceal areas where pixels of the previous frame have no match in the current frame and full frame reveal areas where pixels of the current frame have no match in the previous frame;
an intermediate frame occlusion generator configured to determine intermediate frame occlusion areas of an interpolated frame of the displayable output by locating intermediate frame conceal areas based on projected locations of pixels within the full frame conceal areas using primary forward motion vectors and information about a time slot for the interpolated frame, and by locating intermediate frame reveal areas based on projected locations of pixels within the full frame reveal areas using primary backward motion vectors and information about the time slot for the interpolated frame; and an intermediate frame occlusion modifier configured to:
modify the intermediate frame conceal areas by projecting locations of pixels using secondary forward motion vectors, wherein the secondary forward motion vectors are associated with a frame subsequent to the current frame; and
modify the intermediate frame reveal areas by projecting locations of pixels using secondary backward motion vectors, wherein the secondary backward motion vectors are associated with a frame prior to the previous frame.

18. The interpolator of claim 17, further comprising a histogram filterer coupled to the intermediate frame occlusion generator, the forward data store and the backward data store.

19. The interpolator of claim 17, wherein the full frame occlusion generator is a halo reducing interpolator.

20. An apparatus for performing motion compensated interpolation using a previous frame and a current frame of a displayable output, the apparatus comprising:
means for determining full frame occlusion areas of the displayable output by locating full frame conceal areas where pixels of the previous frame have no match in the current frame and full frame reveal areas where pixels of the current frame have no match in the previous frame;
means for determining intermediate frame occlusion areas of an interpolated frame of the displayable output by location intermediate frame conceal areas based on projected locations of pixels within the full frame conceal areas using primary forward motion vectors and information about a time slot for the interpolated frame, and by locating intermediate frame reveal areas based on projected locations of pixels within the full frame reveal areas using primary backward motion vectors and information about the time slot for the interpolated frame;
means for modifying the intermediate frame conceal areas by projecting locations of pixels using secondary forward motion vectors, wherein the secondary forward motion vectors are associated with a frame subsequent to the current frame; and
means for modifying the intermediate frame reveal areas by projecting locations of pixels using secondary backward motion vectors, wherein the secondary backward motion vectors are associated with a frame prior to the previous frame.

21. The apparatus of claim 20, further comprising:
means for, for any pixels in the interpolated frame to which there is neither a forward vector nor a backward vector projecting:
including the pixel in an intermediate frame conceal area if it is not located within the full frame reveal area; and
including the pixel in an intermediate frame reveal area if it is not located within the full frame conceal area; and
means for using the intermediate frame conceal and reveal areas to interpolate values for pixels within an area of the interpolated frame.

22. A computer chip configured to:
determine full frame occlusion areas of the displayable output by locating full frame conceal areas where pixels of the previous frame have no match in the current frame and full frame reveal areas where pixels of the current frame have no match in the previous frame;
determine intermediate frame occlusion areas of an interpolated frame of the displayable output by locating intermediate frame conceal areas based on projected locations of pixels within the full frame conceal areas using primary forward motion vectors and information about a time slot for the interpolated frame, and by locating intermediate frame reveal areas based on projected locations of pixels within the full frame reveal areas using primary backward motion vectors and information about the time slot for the interpolated frame;
modify the intermediate frame conceal areas by projecting locations of pixels using secondary forward motion vectors, wherein the secondary forward motion vectors are associated with a frame subsequent to the current frame; and
modify the intermediate frame reveal areas by projecting locations of pixels using secondary backward motion vectors, wherein the secondary backward motion vectors are associated with a frame prior to the previous frame.

* * * * *